(12) United States Patent
Wiatrowski et al.

(10) Patent No.: US 9,167,599 B2
(45) Date of Patent: Oct. 20, 2015

(54) CHANNEL STRUCTURE FOR NON-CONTENTION BASED WINDOWS AND CONTENTION BASED RANDOM ACCESS REQUESTS

(75) Inventors: David G. Wiatrowski, Woodstock, IL (US); Dipendra M. Chowdhary, Hoffman Estates, IL (US); Thomas B. Bohn, McHenry, IL (US); Puneet K. Puri, Schaumburg, IL (US); Roopak M. Ingole, Schaumburg, IL (US); Delia M. Marchosky, Wauconda, IL (US); Abhishek Kumar, Chicago, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 859 days.

(21) Appl. No.: 12/888,177

(22) Filed: Sep. 22, 2010

(65) Prior Publication Data

US 2012/0069786 A1 Mar. 22, 2012

(51) Int. Cl.
*H04W 64/00* (2009.01)
*H04W 74/02* (2009.01)
*G01S 5/14* (2006.01)
*H04B 7/26* (2006.01)
*H04W 8/22* (2009.01)
*H04W 36/06* (2009.01)
*H04W 72/04* (2009.01)
*H04W 74/04* (2009.01)
(Continued)

(52) U.S. Cl.
CPC .............. *H04W 74/02* (2013.01); *G01S 5/14* (2013.01); *H04B 7/2606* (2013.01); *H04W 8/22* (2013.01); *H04W 36/06* (2013.01); *H04W 64/00* (2013.01); *H04W 72/042* (2013.01); *H04W 72/0413* (2013.01); *H04W 74/04* (2013.01); *H04W 74/0833* (2013.01); *H04W 84/047* (2013.01)

(58) Field of Classification Search
None
See application file for complete search history.

(56) References Cited

U.S. PATENT DOCUMENTS 5,323,446 A * 6/1994 Kojima et al. ................. 455/437
5,724,168 A * 3/1998 Oschmann et al. ........... 398/127
(Continued)

OTHER PUBLICATIONS

Gaurav Jolly, et al. "An Energy-Efficient, Scalable and Collision-Free Mac Layer Protocol for Wireless Sensor Networks", Wireless Communications and Mobile Commuting, Aug. 23, 2004; 20 Pages.
(Continued)

*Primary Examiner* — Gregory Sefcheck
*Assistant Examiner* — Daniel Mitchell
(74) *Attorney, Agent, or Firm* — Anthony P. Curtis; Daniel R. Bestor; Barbara R. Doutre

(57) ABSTRACT

Methods of communicating location information from a subscriber to a repeater are described. The subscriber switches from a working channel to a data revert channel, transmits a request for a periodic or one-time window to transmit an update, and determines from grant information in the response announcement the allocated window and frame before switching back to the working channel. Before the allocated time, the subscriber switches to the data revert channel, confirms whether it remains scheduled to transmit the update from a repeater announcement, and if so transmits the location update in either the current or reserved window. The announcements from the repeater contain the identity of the next window and frame and the subscriber reserved to use the window in addition to grant information. The subscribers may or may not be time-aligned and the data and data revert channels may or may not be synchronized.

4 Claims, 17 Drawing Sheets

(51) Int. Cl.
*H04W 74/08* (2009.01)
*H04W 84/04* (2009.01)

(56) References Cited

U.S. PATENT DOCUMENTS

| | | | |
|---|---|---|---|
| 5,784,365 A * | 7/1998 | Ikeda | 370/337 |
| 6,490,256 B1 * | 12/2002 | Jones et al. | 370/277 |
| 6,567,387 B1 * | 5/2003 | Dulin et al. | 370/329 |
| 7,855,985 B2 * | 12/2010 | Kwon | 370/310 |
| 8,310,996 B2 * | 11/2012 | Nanda et al. | 370/329 |
| 2004/0038666 A1 * | 2/2004 | Lohtaja et al. | 455/410 |
| 2004/0042424 A1 | 3/2004 | Hsien-Tsung | |
| 2007/0015462 A1 * | 1/2007 | Dean et al. | 455/15 |
| 2007/0042797 A1 | 2/2007 | Lee et al. | |
| 2008/0002734 A1 * | 1/2008 | Zheng et al. | 370/445 |
| 2008/0069036 A1 | 3/2008 | Lee et al. | |
| 2008/0298280 A1 * | 12/2008 | Joshi et al. | 370/280 |
| 2009/0046678 A1 * | 2/2009 | Lee et al. | 370/338 |
| 2009/0067389 A1 * | 3/2009 | Lee et al. | 370/336 |
| 2009/0122780 A1 | 5/2009 | Valdivia et al. | |
| 2009/0252065 A1 * | 10/2009 | Zhang et al. | 370/256 |
| 2010/0080139 A1 * | 4/2010 | Palanki et al. | 370/252 |
| 2010/0091672 A1 * | 4/2010 | Ishii | 370/252 |
| 2010/0093360 A1 * | 4/2010 | Choi et al. | 455/450 |
| 2010/0142559 A1 * | 6/2010 | Hu | 370/474 |
| 2010/0158077 A1 * | 6/2010 | Mahany | 375/132 |
| 2010/0246427 A1 * | 9/2010 | Gheorghiu et al. | 370/252 |
| 2012/0184284 A1 * | 7/2012 | Moisio et al. | 455/452.1 |
| 2013/0028221 A1 * | 1/2013 | Seo et al. | 370/329 |

OTHER PUBLICATIONS

Tia Standard; Wideband Air Interface Media Access Control Radio Link Adaptation (Mac/RLA) Layer Specification; TIA-902.BAAC-A; Feb. 12, 2007; 121 Pages.

International Search Report and Written Opinion for International Application No. PCT/US20111048717 mailed on Feb. 24, 2012.

* cited by examiner

| | WINDOW NUMBER | | | | | | | |
|---|---|---|---|---|---|---|---|---|
| WINDOW SIZE = 5 (300 MSEC); 1600 WINDOWS PER DATA SUPERFRAME (8 MINUTES); 200 WINDOWS/MIN | 1 | 2 | 3 | 4 | 5 | 6 | 7 | ... | 100 |
| 1 | SU1 | SU2 | FREE | SU6 | FREE | FREE | FREE | ... | SU5 |
| 2 | SU1 | SU4 | SU3 | SU7 | FREE | FREE | FREE | ... | FREE |
| 3 | SU1 | FREE | FREE | FREE | FREE | FREE | FREE | ... | SU5 |
| 4 | SU1 | SU4 | FREE | FREE | FREE | FREE | FREE | ... | FREE |
| 5 | SU1 | SU2 | SU3 | FREE | FREE | FREE | FREE | ... | SU5 |
| 6 | SU1 | SU4 | FREE | FREE | FREE | FREE | FREE | ... | FREE |
| 7 | SU1 | FREE | FREE | FREE | FREE | FREE | FREE | ... | SU5 |
| 8 | SU1 | SU4 | SU3 | FREE | FREE | FREE | FREE | ... | FREE |
| 9 | SU1 | SU2 | FREE | SU6 | FREE | FREE | FREE | ... | SU5 |
| 10 | SU1 | SU4 | FREE | FREE | FREE | FREE | FREE | ... | FREE |
| 11 | SU1 | FREE | FREE | FREE | FREE | FREE | FREE | ... | SU5 |
| 12 | SU1 | SU4 | SU3 | FREE | FREE | FREE | FREE | ... | FREE |
| 13 | SU1 | SU2 | FREE | FREE | FREE | FREE | FREE | ... | SU5 |
| 14 | SU1 | SU4 | FREE | FREE | FREE | FREE | FREE | ... | FREE |
| 15 | SU1 | FREE | FREE | FREE | FREE | FREE | FREE | ... | SU5 |
| 16 | SU1 | SU4 | FREE | FREE | FREE | FREE | FREE | ... | FREE |

DATA FRAME NUMBER

*FIG. 5A*

CHANNEL STRUCTURE FOR NON-CONTENTION BASED WINDOWS AND CONTENTION BASED RANDOM ACCESS REQUESTS

TECHNICAL FIELD

The present invention relates to a method and system in which scheduled data communications are provided in a communication system.

BACKGROUND

Wireless communication systems contain subscribers, which may be mobile or portable radio units, and fixed infrastructure through which the subscribers communicate in a trunked mode. The infrastructure contains, for example, base stations and controllers. The subscribers are geographically distributed and generally communicate using different base stations.

Typical communications systems transmit voice, video or other data (hereinafter referred to merely as "data") messages amongst the subscribers and base stations using working channels, which are predetermined frequencies and timeslots. The working channels are random access channels and are different dependent on the message direction: an inbound (or uplink) channel is used for communications from the subscriber to the base station and an outbound (or downlink) channel is used for communications from the base station to the subscriber. When a subscriber wishes to transmit data to other subscribers, the subscriber first determines the status of the uplink channel—i.e., whether it is busy or idle. In European Telecommunications Standards Institute Digital Mobile Radio (ETSI-DMR) systems, the downlink channel periodically transmits a CACH (Common Announcement Channel) burst that indicates the status of the channel.

In many systems, the subscriber is required to monitor the uplink channel for an extended period of time prior to attempting to transmit data. Once the subscriber determines that the uplink channel is idle, the subscriber may attempt to transmit the data by first sending a request to transmit to the base station. If a large number of subscribers use the same working channel, multiple subscribers may attempt to transmit these requests at the same time, causing collisions between the requests. Base stations receiving multiple colliding messages at the same time typically do not respond to the messages as they mutually interfere with one another, causing each message to be retransmitted. Adding to this, communication systems also typically require a confirmation message be sent to the subscriber on the outbound channel to confirm receipt of the message from the subscriber. This increases the bandwidth usage on the outbound channel as well as further increasing the amount of time it takes to transmit the data from the subscriber.

These problems have become increasingly problematic due to the recent desirability of determining the location of the subscriber using the Global Positioning System (GPS) or other systems. As subscriber location information presents a heavy traffic load on a channel due to its frequent transmissions, to minimize the impact that location data might have on other data traffic, such as voice traffic, the location data can be transmitted on a separate random access channel. The throughput of this separate channel, however, is also limited by the above factors, i.e., channel access procedures (which take about 540 ms) and collision probability. Simulation in one example (in which ETSI DMR protocol using half rate FEC, transmissions are 6 bursts and radios have a 150 ms channel access collision window is used) shows that when sending location messages on the separate channel, for a target probability of success to be 93% or better (which is generally considered an acceptable level), no more than 20 updates per minute per channel should be attempted. While this is reasonable when small groups of subscribers are being tracked, it becomes exceedingly problematic if it is desired to track the locations of a large number of subscribers (e.g., greater than several hundred). This situation may occur, for example when governmental agencies (federal, state, or local) wish to track assigned communication devices in emergency service or other government vehicles. Moreover, other industries such as transportation (e.g., trucking), utilities, manufacturing, hospitality, retail, airport, construction, private security, or storage may wish to employ such tracking. In this case, however, the amount of infrastructure equipment employed to provide the tracking while providing acceptable level of success for location requests becomes large and correspondingly costly.

As it is likely that the desirability for location tracking will only increase, and therefore the number of devices being tracked correspondingly increase, it is therefore desirable to provide a method and system for location tracking using the data revert channel(s) in which number of revert channels and the amount of infrastructure employed, and thus cost, is reduced and in which the amount of time for channel access is minimized.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts, and explain various principles and advantages of those embodiments.

FIG. 5A illustrates one embodiment of scheduling in a data superframe.

Figure 1:
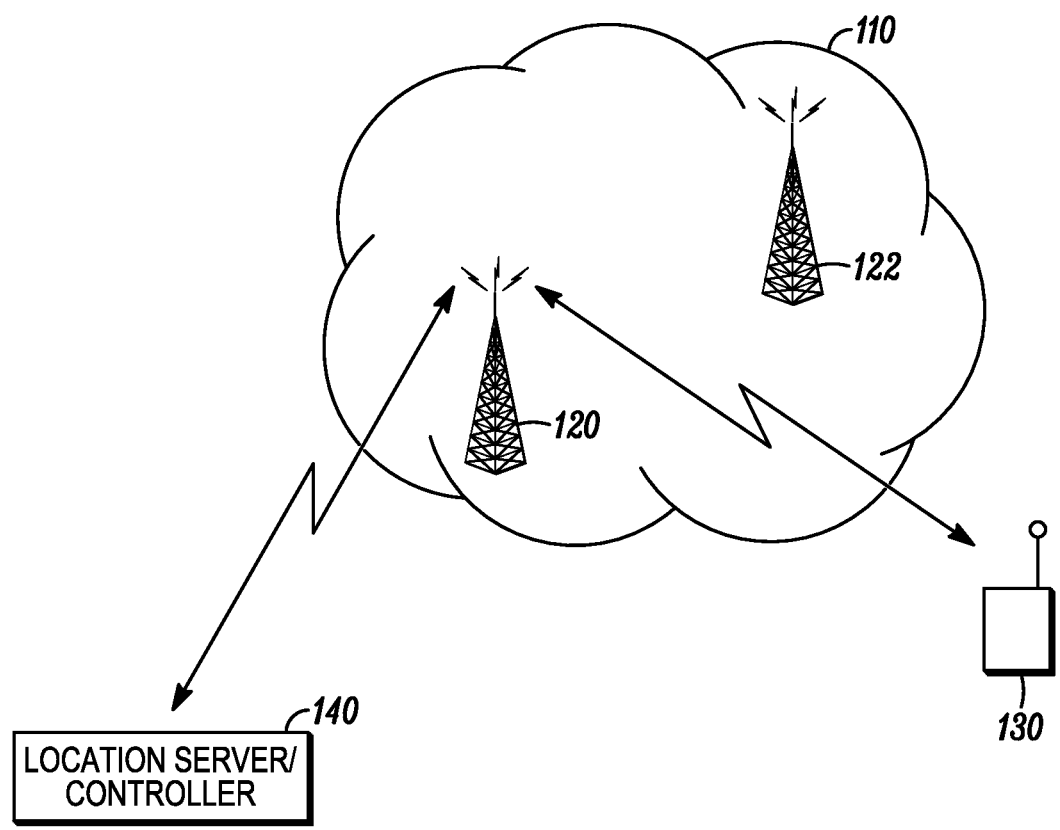
FIG. 1 illustrates an embodiment of a communication system.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

A system and method are provided in which subscribers use a secondary (revert) channel to schedule and transmit updates to a repeater. The channel is structured to support non-contention based communication windows during which the location information is transmitted to the repeaters—i.e., a specific different window is assigned to each subscriber. The initial request to determine and assign the communication window is a contention based random access request. The communication window includes multiple timeslots at least one of which remains unassigned during which time the repeater broadcasts identification and assignment information for the next communication window as well as new assignment information to a requesting subscriber. The number of windows assigned during a particular time period (e.g., frame or data superframe) is determined by the update frequency requested by the subscriber in the request.

Although periodic and one-time location updates are generally described herein, similar techniques can be used to schedule periodic or one-time data transfers of other types, such as voice or video information or Audience Response System (ARS) messages may be provided to the repeater via scheduled update(s). Although the updates can be of any type of data, for convenience the following description will refer entirely to location updates.

FIG. 1 illustrates a general network 100 that includes an infrastructure 110. There are many distributed elements in the infrastructure 110, some local to each other and others disposed geographically distant from each other. Such elements include one or more repeaters 120, 122 which provide connectivity for a subscriber 130 disposed within the coverage area serviced by the repeaters 120 to other devices either in the same coverage area or in a different coverage area through the infrastructure 110. A repeater retransmits the information it receives. The repeaters 120, 122 each may comprise a plurality of repeaters that are capable of receiving and retransmitting messages amongst the subscribers 130. One repeater 120 may be local to/service a particular subscriber 130 and act as a slave to a scheduling repeater 122 (called herein a scheduler).

The infrastructure 110 may also comprise various other elements not shown in FIG. 1. The infrastructure 110 may be connected to a number of additional content sources, such as the Internet or various Intranets and may comprise multiple interconnected zones, each containing a zone controller, base sites, and data servers. The infrastructure 110 may also be linked to a public switched telephone network (PSTN), a paging network, or a facsimile machine.

The subscribers 130 can be mobile or portable wireless radio units, cellular radio/telephones, or any other type of device capable of wirelessly communicating with the infrastructure. Examples of subscribers include cellular telephones, personal digital assistants, or communication devices used by emergency personnel and may be coupled to other devices such as video terminals, portable computers, or the like. Other elements such as a controller may be used to allocate radio frequency (RF) communication resources amongst the subscribers. The controller may be disposed at one location or may be distributed among the repeaters.

One or more location servers 140 may be disposed at various locations. The repeaters 120, 122, after having received the location update from the subscriber 130, either provide this information to the appropriate location server(s) 140 directly (as shown by the solid line) without repeating the information or repeat the information to a controller 150, which then provides the location update to the location server 140 (as shown by the dashed line). The location server(s) 140 stores, displays (or otherwise provides) and/or manipulates the location data as desired. A particular set of subscribers 130 may be associated with the location server(s) 140 due to geographic and/or logical reasons. In various embodiments, a location server 140 may keep track of all subscribers 130 within one or more limited geographic areas (e.g., local to the location server 140) or all subscribers in one or more talkgroups. Talkgroups are well known to one of skill in the art and thus will not be described in detail.

Figure 2:
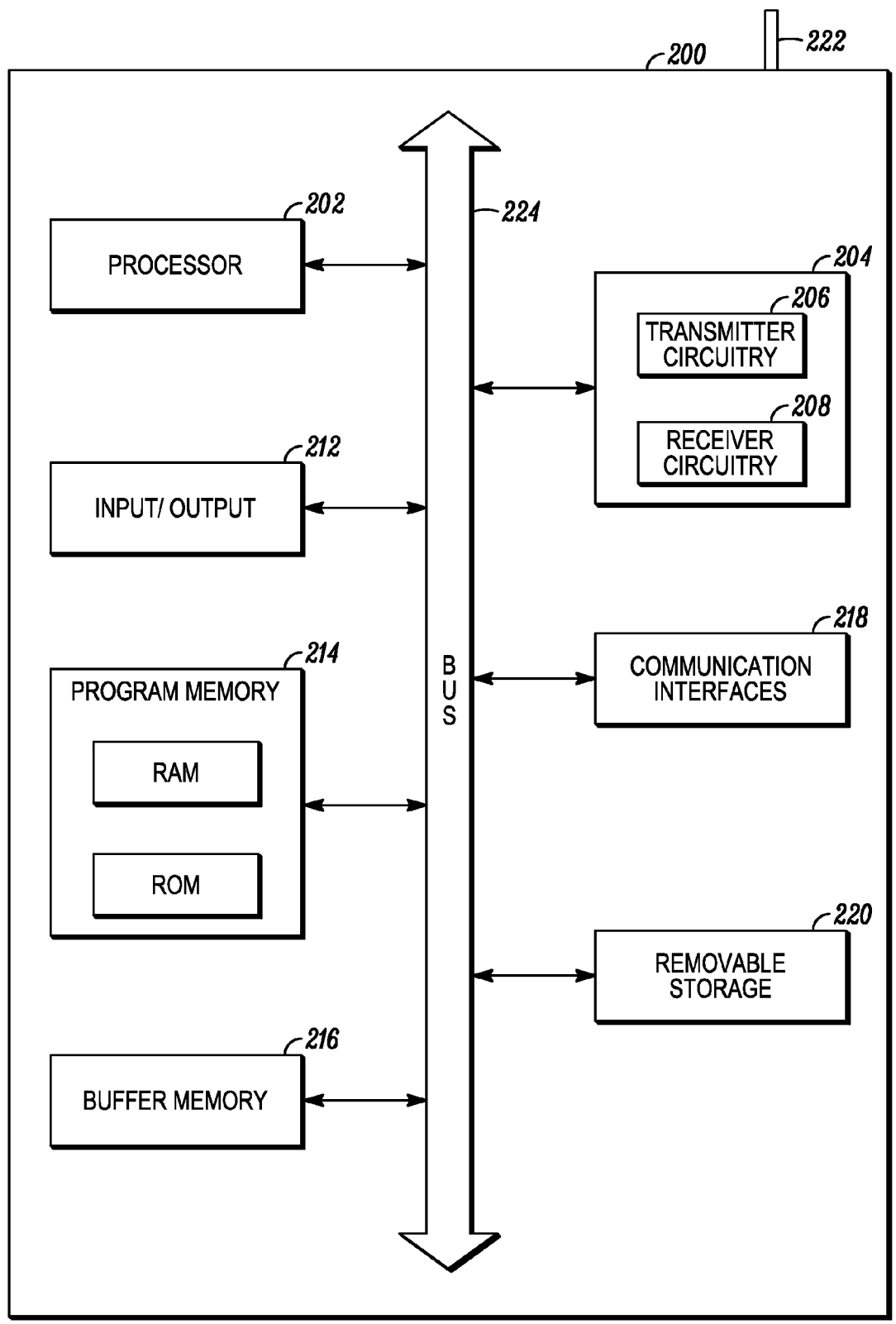
FIG. 2 illustrates an internal block diagram of an embodiment of a communication device.

An embodiment of a communication device such as a subscriber or repeater is shown in the block diagram of FIG. 2. The communication device 200 may contain, among other components, a processor 202, a transceiver 204 including transmitter circuitry 206 and receiver circuitry 208, an antenna 222, I/O devices 212, a program memory 214, a buffer memory 216, one or more communication interfaces 218, and removable storage 220. The communication device 200 is preferably an integrated unit and may contain at least all the elements depicted in FIG. 2 as well as any other element necessary for the communication device 200 to perform its electronic functions. The electronic elements are connected by a bus 224.

The processor 202 includes one or more microprocessors, microcontrollers, DSPs, state machines, logic circuitry, or any other device or devices that process information based on operational or programming instructions. Such operational or programming instructions are stored in the program memory 214 and may include instructions such as estimation and correction of a received signal, encryption/decryption, and decisions about whether an alarm exists that are executed by the processor 202 as well as information related to the transmit signal such as modulation, transmission frequency or signal amplitude. The program memory 214 may be an IC memory chip containing any form of random access memory (RAM) and/or read only memory (ROM), a floppy disk, a compact disk (CD) ROM, a hard disk drive, a digital video disk (DVD), a flash memory card or any other medium for storing digital information. One of ordinary skill in the art will recognize that when the processor 202 has one or more of its functions performed by a state machine or logic circuitry, the memory 214 containing the corresponding operational instructions may be embedded within the state machine or logic circuitry. The operations performed by the processor 202 and the rest of the communication device 200 are described in detail below.

The transmitter circuitry 206 and the receiver circuitry 208 enable the communication device 200 to respectively transmit and receive communication signals. In this regard, the transmitter circuitry 206 and the receiver circuitry 208 include appropriate circuitry to enable wireless transmissions. The implementations of the transmitter circuitry 206 and the receiver circuitry 208 depend on the implementation of the communication device 200 and the devices with which it is to communicate. For example, the transmitter and receiver circuitry 206, 208 may be implemented as part of the communication device hardware and software architecture in accordance with known techniques. One of ordinary skill in the art will recognize that most, if not all, of the functions of the transmitter or receiver circuitry 206, 208 may be implemented in a processor, such as the processor 202. However, the processor 202, the transmitter circuitry 206, and the receiver circuitry 208 have been artificially partitioned herein to facilitate a better understanding. The buffer memory 216 may be any form of volatile memory, such as RAM, and is used for temporarily storing received or transmit information.

The communication device 200 may also contain a variety of I/O devices such as a keyboard with alpha-numeric keys, a display (e.g., LED, OELD) that displays information about the repeater or communications connected to the repeater, soft and/or hard keys, touch screen, jog wheel, a microphone, and a speaker.

As discussed above, it is becoming increasingly desirable for subscribers to transmit location updates. Compared to voice or other data communications, location updates occur relatively frequently and at predetermined times. While these updates present challenges due to the large amount of traffic generated, due to their periodic nature, they are able to be scheduled which make more efficient use of the channel. Taking advantage of the periodicity, a channel structure has been developed that enables the desired efficiencies to be achieved. Beneficial aspects of the method include that it supports non-periodic, non-scheduled transmissions (e.g., for making requests for scheduled data windows as well as Automatic Registration Service (ARS) presence registration). ARS is signaling sent from the subscriber to a server to notify that the subscriber is present on the system. In addition, unlike other systems, the repeaters may or may not be time-aligned (although the subscribers remain aligned to the repeaters), which is normally accomplished using a special control channel. Unfortunately, although some systems have a control channel through which the subscribers may be time-aligned (and supporting software), not all systems may have such a control channel.

Figure 3:
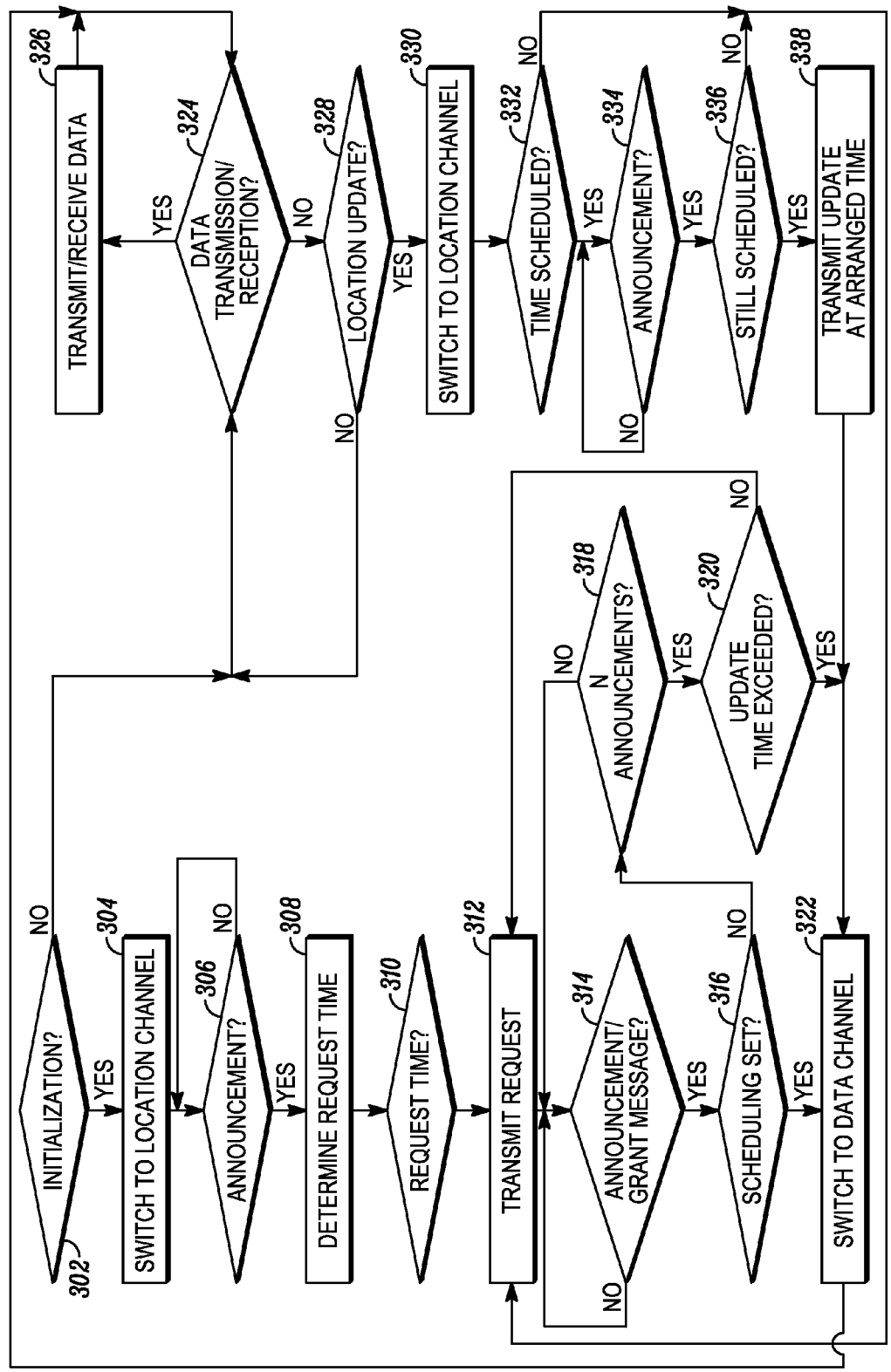
FIG. 3 illustrates one embodiment of a flowchart of the method of establishing and communicating location updates.

A basic flowchart of the method of establishing and communicating location updates is shown in FIG. 3. As is apparent, this method is implemented by the subscriber although a complementary method that works with the subscriber to achieve the scheduling of the channel may be implemented by the repeater. As used herein, the term "working channel" is defined as the default uplink/downlink channels used when audio, video or other information is transmitted to/from the subscriber. The working channel may be a direct mode channel, a repeater channel, or a channel that is part of a trunked system. The working channel may also be a single site or multi-site channel. The term "data revert channel" is the uplink/downlink channels used to provide location update-related information (including both location data such as GPS data as well as scheduling data). Although only location updates are described herein, other types of data (e.g., ARS registration data, and in the future short messaging) may be provided on the data revert channel.

The subscriber powers up and initializes at step 302. The subscriber switches to the downlink data revert channel at step 304 and waits at step 306 until an announcement is received from a repeater. When the announcement is received, the subscriber determines from the announcement at step 308 when to transmit a request, thereby aligning itself in time to the transmissions from the repeater, and at step 310 waits until this time. When this time is reached, at step 312 the subscriber transmits a request for scheduling a location update to the repeater on the uplink.

The subscriber then at step 314 switches to the downlink data revert channel waits a predetermined amount of time for an announcement or grant message from the repeater. The announcement announces information to all listening subscribers (i.e., tuned to the channel on which the repeater is transmitting) while the grant message is individualized. The announcement will be described in more detail later but announces present and future scheduling information. In other embodiments, the subscriber may first wait for the announcement and then request scheduling after receiving the announcement. This latter embodiment permits the subscriber to determine via the announcement that the repeater has no free availabilities in which to schedule location updates and thus an alternate set of data revert channels should be used. The grant message will also be described in more detail later.

When the subscriber receives the announcement, the subscriber determines at step 316 whether and when the repeater has scheduled the subscriber for periodic (or one-time) location updates. If the announcement does not contain the information, the subscriber determines at step 318 whether a sufficient number of announcements (usually 1-2) have been transmitted by the repeater such that if the request had been received, a response would have been provided in the last announcement.

If the subscriber determines that a sufficient number of announcements have not been received, it returns to step 314 continues to wait for the next announcement. If the subscriber determines that a sufficient number of announcements have been received, it next determines at step 320 whether it has spent too much time on the data revert channel (e.g., sent too many requests to the repeater) in order to minimize missed calls on the working channel. If the subscriber determines that another request is warranted, the subscriber then returns to step 312. If the subscriber determines that it has sent a predetermined maximum number of requests (e.g., 2-3) or has been located at the data revert channel for the maximum amount of time waiting for an acknowledgement in the announcement, the subscriber returns to the working channel (generally downlink) at step 322. This time period can be, for example, 2-3 windows (e.g., up to about 1 s) or as long as the subscriber can hold the data in its queue, which in one embodiment is 53 seconds.

Once the subscriber determines at step 316 that the scheduling is set, it switches back to the working channel at step 322 and enters normal operation (after all other initialization has been completed). When in normal operation, the subscriber determines at step 324 whether data is to be transmitted or received on the working data channel. If the subscriber determines that data is to be transmitted or received, at step 326 the subscriber transmits or receives this working traffic data and then returns to step 324. Working channel traffic data such as audio communications take precedence over location updates, the subscriber stores or discards the location information if the time arrives for a location update but the working channel traffic data transmission/reception is ongoing. Although not shown in FIG. 3, the subscriber can buffer or queue the data that is being transmitted/received to perform the location update at the appropriate time and then reinstate the data flow after the location update is complete.

If the subscriber determines that no data is to be transmitted or received, at step 328 the subscriber determines whether it has arrived at the location update time scheduled by the repeater or whether it has stored location updates to transmit. If the subscriber determines that the location update time has not been reached or there are no location updates to transmit, the subscriber returns to step 324. If the subscriber determines that the location update time has been reached or it has stored location updates to transmit, at step 330 the subscriber switches to the downlink data revert channel and determines at step 332 if a location update time has been previously scheduled for the present location update. In other words, the location update time can be either for a periodic location update or a non-repeating location update for the above stored location update that occurred during other communications, the latter of which is generally not scheduled during initialization.

If the location update is non-periodic (i.e., for a queued location update), the subscriber returns to step 312, where it schedules an update time for the one-time request. If the location update has been previously scheduled at step 332, whether or not the location update is periodic, at step 334 the subscriber waits for the next announcement by the repeater and at step 336 determines whether the subscriber is still scheduled to transmit its update for the designated time. As described below, if the subscriber remains inactive (not transmitting in its allocated window) for an extended period of time, the repeater may de-allocate the reserved update time. If the subscriber is still scheduled, the subscriber switches to the uplink data revert channel and at step 338 transmits its location to the repeater before switching back to the downlink working channel at step 332. If the subscriber is no longer scheduled, the subscriber returns to step 312, where it schedules a new update time. These steps allow at least some of the overhead associated with traditional channel access procedures (wait time associated with monitoring and detecting channel status—e.g., 180 ms monitoring and 120 ms channel status) to be eliminated.

Although the flowchart of FIG. 3 shows only one update, as above if the subscriber has been transmitting/receiving data at step 326, multiple location updates may be queued and sent to the repeater. In one embodiment, after arriving on the downlink data revert channel and verifying its reserved window is next, in the burst preceding the scheduled location update, the subscriber transmits a request for an additional one-time window. After completion of the location update the subscriber receives a grant in the announcement for an upcoming window. It may be desirable for the newly granted window to be close in time so the subscriber remains on the data revert channel and transmits the second location update. This process can be repeated until all of the queued location updates have been transmitted or for a limited predetermined amount of time after which the subscriber reverts back to the working channel to check whether any data is to be transmitted/received. In one embodiment, the one-time location updates can be scheduled in blocks of time, for example in time periods in which the subscriber believes are likely to be idle (no transmissions from/to the subscriber).

Figure 4:
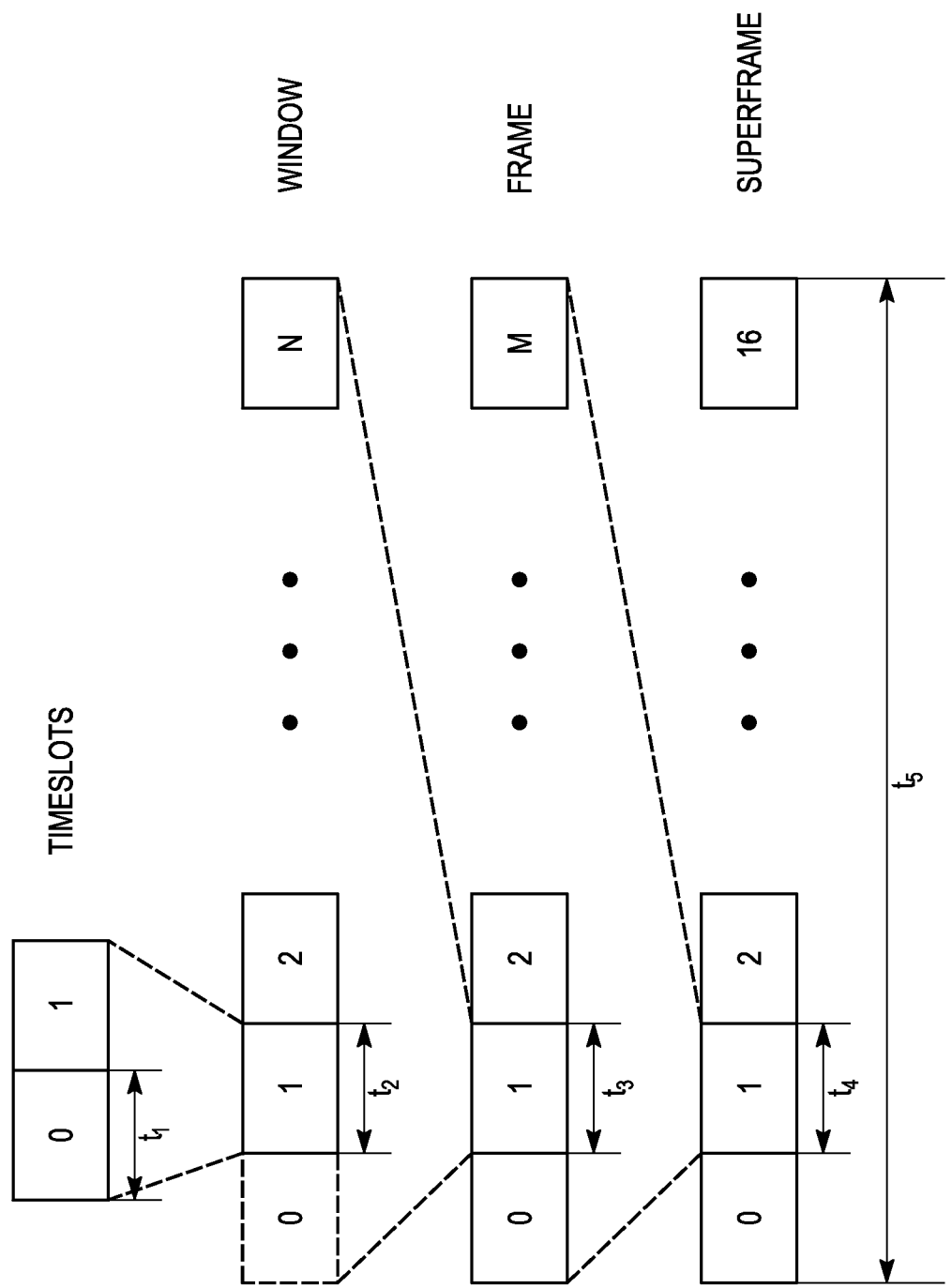
FIG. 4 illustrates one embodiment of a channel structure.

One embodiment of the channel structure is shown in FIG. 4. The channel structure contains timeslots, windows, frames and data superframes. The timeslots are defined in various standards and are standard time division multiple access (TDMA) timeslots. In the embodiment shown in FIG. 4, each timeslot occupies $t_1$=30 ms (although in other embodiments, this may vary). As the timeslots on a TDMA channel operate completely independently from one another and may not have the same windowing structure, alignment between announcement frames for one timeslot with announcement frames with the other timeslot may not coincide (although they are shown as being aligned in FIG. 4). In other embodiments, one or more of the timeslots may be serving in some other capacity rather than providing scheduled location updates. In one particular example, an ETSI-DMR structure in which 2 independent timeslots are used (thus $t_2$=60 ms). In other embodiments, however, a larger number of timeslots may be used.

For subscribers, each timeslot, when not idle, is occupied by a burst of voice, data, or control information (also called a burst) at a particular frequency dependent on which of the timeslots the burst occupies. In particular, bursts within each timeslot are 27.5 ms long with 1.25 ms guard time (either idle or used for CACH transmission) at each end of the burst. As the timeslots may essentially operate independently, for convenience the following discussion will focus on only one set of timeslots used by a subscriber (understanding that there are one or more intervening independent timeslots between each of the timeslots in the set of timeslots).

A window is formed from N timeslots, where N is an integer, and occupies a time period $t_2$ dependent on N. In various embodiments, N may be 1-10 and thus $t_3$ in one embodiment ranges from 60 ms-600 ms. A window is defined to be one or more timeslots greater than the minimum number of contiguous timeslots that are required for a subscriber to transmit a data message on the uplink to the repeater. In the embodiments described herein, the window is one timeslot greater than the required minimum number of contiguous timeslots. The first timeslot of the window (shown by the dashed box in FIG. 4) is used by the repeater to transmit an announcement on the downlink data revert channel. The subscriber uses the remaining timeslots of the window to transmit a data message on the uplink data revert channel (and these are also repeated on the downlink when window size N>1). For example, when a 4 burst message is transmitted on the uplink data revert channel, the window size is set to 5 timeslots (300 msec).

A Data Frame (or frame) is defined to be a sequence of all whole windows in a predetermined second interval. In one example, this second interval is 30 s ($t_4$=30 s). In this embodiment, all the windows in a frame are of the same size. The number of complete windows in a frame depends on the size of windows being used on the channel. For example, in a frame: there are 100 windows (each being 300 ms) of 5 timeslots; 83 windows of 6 timeslots, in which case the last 2 timeslots are unused (and thus may be used for other purposes); 71 windows of 7 timeslots, in which case the last 3 timeslots are unused; 62 windows of 8 timeslots, in which case the last 4 timeslots are unused; 55 windows of 9 timeslots, in which case the last 5 timeslots are unused; and 50 windows of 10 timeslots.

A data superframe is defined to be a sequence of N (herein 16) frames, and is in one example 8 minutes long ($t_5$=8 min) In various embodiments, there are 1600 windows of 5 timeslots available in a data superframe, there are 1328 windows of 6 timeslots available in a data superframe, etc. . . . The values $t_1$-$t_5$ may vary in different systems.

Subscribers can request times to update their location data as desired—e.g., from once each frame (i.e., every 30 s) to once each data superframe (i.e., every 8 minutes) and various points therebetween, 60 sec, 120 sec, 240 sec. One embodiment of scheduling that occurs (and may be stored in memory of the repeater or a separate controller) is shown in FIG. 5A. In this example, each window is 5 timeslots long and thus, as above, each frame contains 100 windows.

As shown, a first subscriber SU1 is scheduled to update its location data every 30 s and has been assigned the first window of every frame. A second subscriber SU2 is scheduled to update its location data every 120 s and has been assigned the second window of every fourth frame, starting with the initial frame (i.e., frames 1, 5, 9, 13). Similarly, a third subscriber SU3 is also scheduled to update its location data every 120 s and has been assigned the third window of every fourth frame, starting with the second frame (i.e., frames 2, 6, 10, 14). A fourth subscriber SU4 is scheduled to update its location data every 60 s and has been assigned the second window of every other frame, starting with the second frame (i.e., frames 2, 4, 6 . . . ). Similarly, a fifth subscriber SU5 is also scheduled to update its location data every 60 s and has been assigned the last window of every other frame, starting with the first frame (i.e., frames 1, 3, 5 . . . ). A sixth subscriber SU6 is scheduled to update its location data every 240 s and has been assigned the fourth window of every eighth frame (i.e., two windows per data superframe), starting with the initial frame (i.e., frames 1 and 9). Lastly, a seventh subscriber SU7 is scheduled to update its location data every 480 s and has been assigned the fourth window of every sixteenth frame (i.e., only one window per data superframe), starting with the second frame (i.e., frame 2 only).

As is apparent from the example shown in FIG. 5A, 200 location updates per minute per timeslot per repeater can be supported when a 5 burst window is used by the repeater. For example, to accommodate 1200 subscribers each updating its location once per minute, only 3 channels (frequency pairs), 3 repeaters, and 6 control stations (connected to the location server) are used. This is a 90% reduction from previous systems in which 30 channels, 30 repeaters, and 60 control stations were used. In these previous systems, loading a channel with 20 updates per minute generates approximately 10.8 seconds of traffic every minute, leading to only 18% channel utilization: ~82% of the channel's capacity is left unused as above to minimize the probability of random access collisions and lost location transmissions to an acceptable level. In the system disclosed herein, random access collisions are essentially eliminated resulting in increased reliability and channel usage improves from about 18% to over 83% (5 out of 6 timeslots now carry payload).

Scheduling of one-time and repeated location updates in a data superframe may be done randomly or using any algorithm so as to provide a maximum number of subscribers with their desired update frequency. In an embodiment shown in FIG. 5B, the windows in each frame are subdivided into sets of windows (also called areas). The areas may uniformly have the same number of windows or may have different numbers of windows (e.g., one area having 20 windows, another area having 10 windows, a third having 20 windows, a fourth having 40 windows, etc. . . . ). In each area, certain windows (first subset) are reserved for fulfilling periodic location update requests while others (second subset) are reserved for fulfilling one-time location update requests so that the periodic and one-time windows are uniformly distributed in the frame. For example, as shown in the aforementioned example of windows of 5 bursts each in which 100 windows (of a particular timeslot) are present in each frame, the windows can be divided into 5 equal areas of 20 windows per window. In each area, for example the first 18-19 windows are reserved for fulfilling periodic location update requests while the last 1-2 windows are reserved for fulfilling one-time location update requests. The number of windows in each area reserved for a particular type of location update can be configurable. Each area may have the same or a different number of windows reserved for each type of location update (e.g., 19 windows are reserved for fulfilling periodic location update requests in area 1 while 18 windows are reserved for fulfilling periodic location update requests in area 20). As shown, this also permits shared channel usage as indicated below.

In one embodiment, to provide a quick response to both one-time and periodic requests, allocation of such requests is uniformly distributed among the areas. In such an embodiment, when a subscriber requests a window, the repeater if able grants a window in one of the areas and stores in memory which area was selected. When the next request comes (either from the same or a different subscriber), the repeater retrieves in which area the last window was allocated and allocates the next request in an area and window determined by an algorithm. This may be the area immediately adjacent to the stored area or it may be several areas distant from the stored area. With such a distribution both types of requests (one-time or periodic) may be guaranteed to get a nearby window unless the system is extremely busy and most of the windows are already allocated.

Figure 5B:
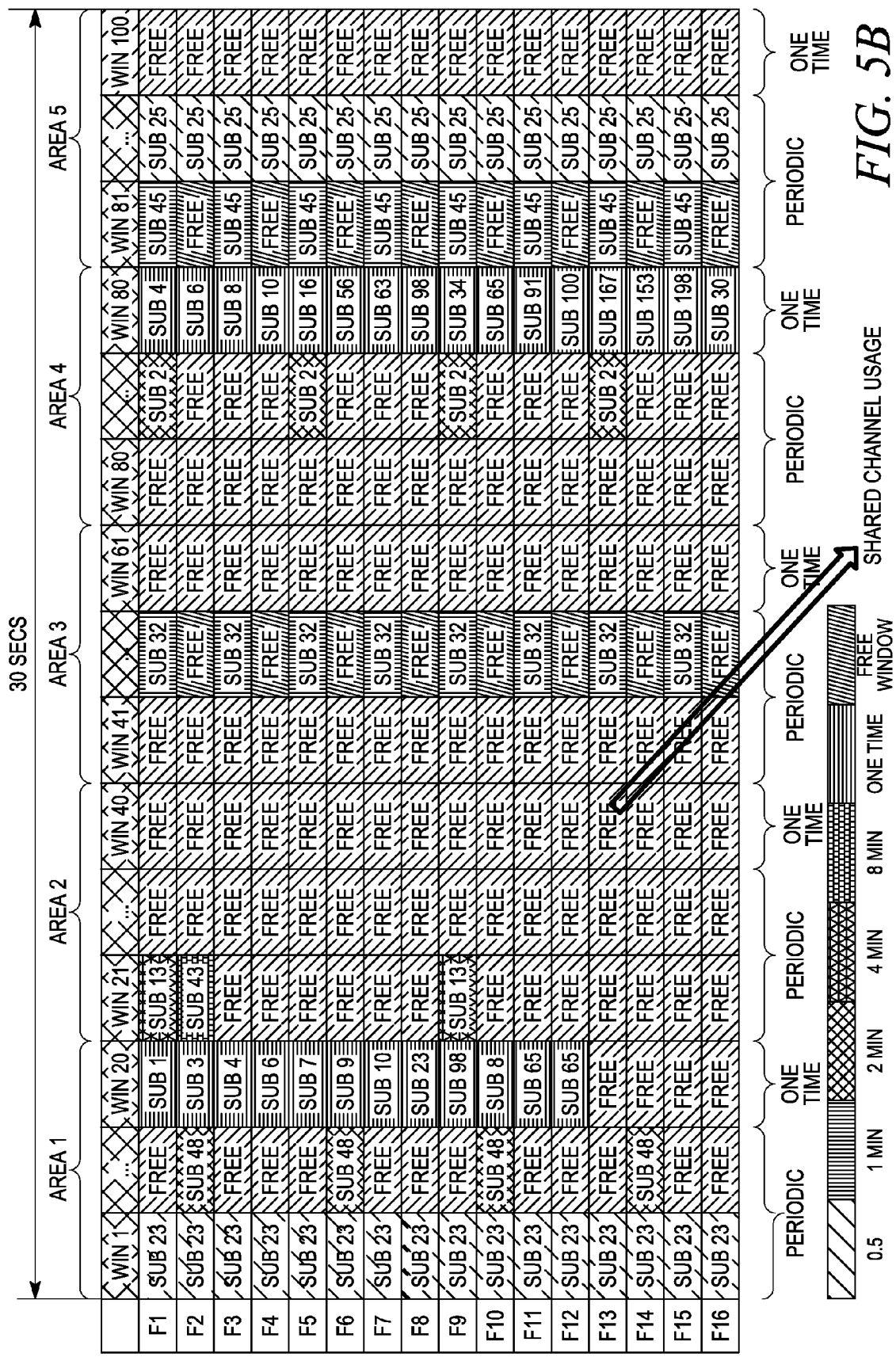
FIG. 5B illustrates another embodiment of scheduling in a superframe.

Upon power on the repeater checks the system configurations (window size and periodic reservation) and maintains the window map according to the area approach shown in FIG. 5B. The repeater transmits the window timing to all listening subscribers in an announcement. During this time three operations occur in parallel on the repeater: 1) Window request processing according to area approach, 2) Free window management, and 3) Shared channel usage. These are described in more detail below.

Figure 6:
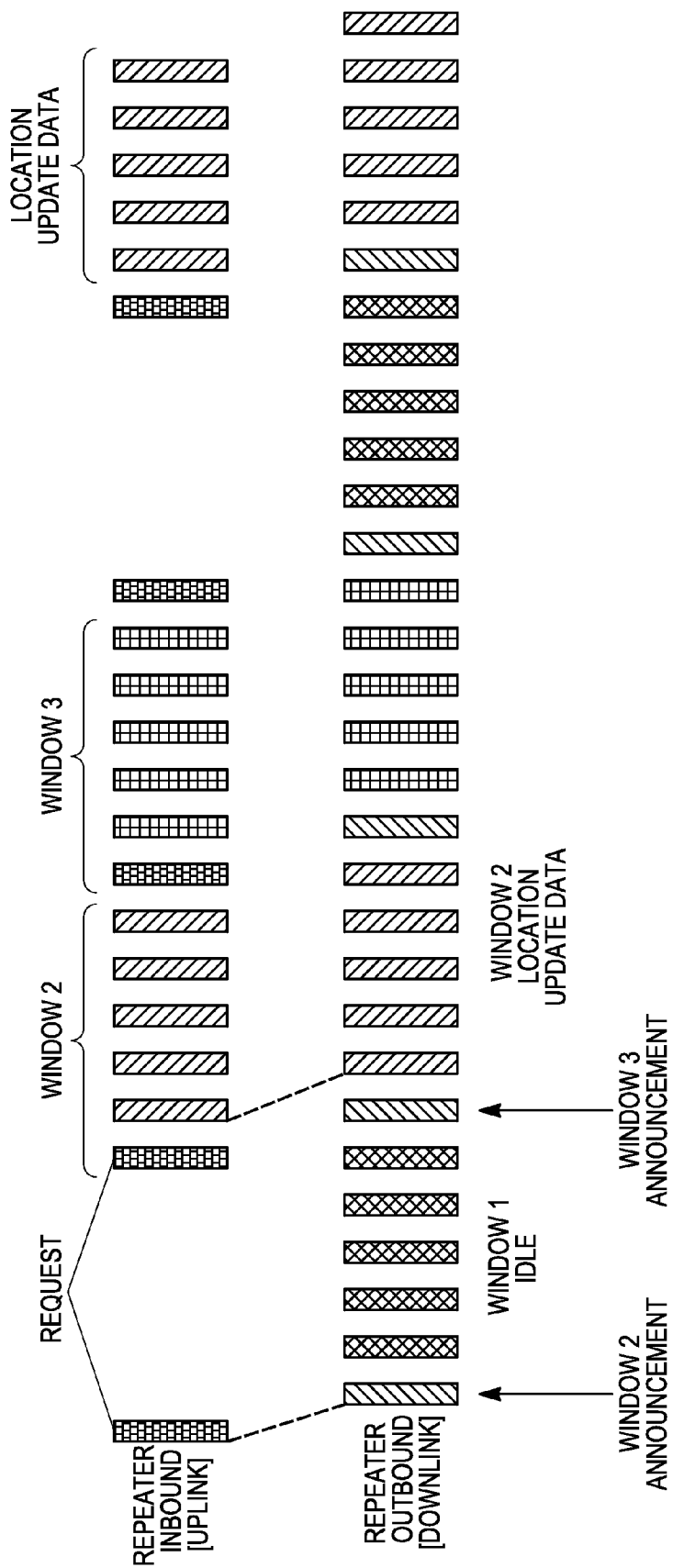
FIG. 6 illustrates one embodiment of the logical structure of the data revert channels.

One embodiment of the logical structure of the data revert channels is shown in FIG. 6. In the embodiment shown, a window contains 6 total bursts. The upper bursts originate from the subscribers and are transmitted to the repeater on the uplink data revert channel while the lower bursts are transmitted from the repeater and are transmitted to the subscribers on the downlink data revert channel. For clarity, only one timeslot is shown—the space between the various transmissions is indicative of the other timeslot. In the upper bursts, a window includes 5 bursts in which location update data may be transmitted and a request burst in which subscribers transmit a request.

The request from a subscriber occurs after the subscriber arrives at the downlink data revert channel and receives an announcement from the repeater. From this the subscriber can determine when the next announcement will occur and transmit the request at the appropriate time. More specifically, the request burst is disposed before the first burst containing location update data, which arrives at the repeater at the same time as the announcement is transmitted from the repeater. A specific burst is set aside in each window for requests such that a request from a subscriber does not overlap location update data from other subscribers, thereby eliminating or reducing much of the channel access time employed in previous methods. Due to the relatively small number of requests relative to windows over a particular time period (other than when a number of subscribers are initializing at the same time), it is likely that the request burst will be empty in a majority of the windows of the upper bursts. Similarly, while requests for one-time or periodic windows for location updates from different subscribers may collide in the request burst, this possibility is relatively small.

As shown in the lower bursts (from the repeater), the window includes an announcement burst and data bursts containing a location update, which was previously reserved and transmitted from a particular subscriber. The announcement burst is disposed before the first burst containing location update data from the repeater. As above for the request, a specific burst is set aside in each window for the announcement. Due to inherent delays, the announcement immediately succeeding the request, transmitted from the subscriber to the repeater on the uplink data revert channel, does not contain the grant. Instead, the announcement corresponding to the grant is transmitted on the downlink data revert channel at least one window later. The announcement is always present, as shown in the embodiment in FIG. 6, at the beginning of the outbound window. After the announcement, the repeater repeats on the downlink location data sent by a scheduled subscriber during the present window. If no subscriber has been scheduled, the bursts after the announcement burst are idle or can be employed for other uses.

In the embodiment of FIG. 6, requests are only provided in the designated request burst. However, if a particular window is not reserved for a subscriber, requests can be provided on the uplink data revert channel at any of the bursts within the unused window. This reduces the amount of request collisions that occur when compared to using the single request burst. For example, as above when a window of 5 bursts is used there are 200 windows per minute. A data revert channel operating with 75% of the windows reserved (50 free windows) results in 150 (free windows*(window size−2)) additional request opportunities per minute. This is a 75% improvement in inbound capacity. Additionally, the downlink data revert channel to support grants is improved by 75% as well. The unused bursts in the window can be assigned in any manner, for example, randomly or using a predetermined sequence.

In one embodiment, as the repeater initializes, it checks the system configurations (window size and periodic reservation) and maintains a window map. The repeater then transmits the window timing to all listening subscribers in an announcement. During this time, three operations occur in parallel on the repeater: window request processing, free window management, and shared channel usage.

In the first operation, window request processing, the repeater allocates windows when new one-time or periodic requests are received. This operation is described throughout the instant specification, e.g., the repeater may allocate windows according to the area approach described in FIG. 5B above so that the windows are uniformly distributed in the frame.

In the second operation, free window management, the repeater detects whether a subscriber fails to arrive on the data revert channel at the allotted time (e.g., due to the subscriber being out of range, operating on a reduced battery or failing to transmit in the assigned window due to transmitting or receiving on the working channel) and may de-allocate the window(s) reserved for the subscriber. As is apparent, the de-allocation occurs only for scheduled repeated location updates—there is no de-allocation counter for one-time windows, which are de-allocated immediately after processing.

In one embodiment, the repeater contains a de-allocation counter, which is adjusted (e.g., incremented or decremented) every time the subscriber does not transmit a location update on its reserved window. When the de-allocation counter reaches a preset threshold, all windows reserved for that subscriber are de-allocated. The threshold may be the same for any subscriber, independent of variables such as the update rate, or may be dependent on the update rate. In one particular embodiment, as the update rate increases, the de-allocation counter may concomitantly increase so that the total inactive/missed time for the different update rates remains the same or increases. For example, for an update rate of every 30 s, the de-allocation counter may be set to 10 and consequently the inactive time is 5 minutes before the repeater de-allocates the window reserved for the subscriber; for an update rate of every minute, the de-allocation counter may be set to 5 and consequently the inactive time is similarly 5 minutes before de-allocation; for an update rate of every 2 minutes, the de-allocation counter may be set to 5 and consequently the inactive time is 10 minutes before de-allocation; for an update rate of every 4 minutes, the de-allocation counter may be set to 5 and consequently the inactive time is 20 minutes before de-allocation; and for an update rate of every 8 minutes, the de-allocation counter may be set to 4 and consequently the inactive time is 20 minutes before de-allocation. The de-allocation counter may be reset if the subscriber transmits before de-allocation.

The repeater may decide also whether or not to perform de-allocation (i.e., override the above decision) based on the number of already-reserved windows. If relatively few windows are reserved, the repeater may decide to adjust the de-allocation counter (e.g., dependent on the percentage of windows reserved) or eliminate de-allocation entirely. On the other hand, if most of the windows are reserved, the repeater may decide to perform de-allocation to free up windows for one-time or repeated location update requests.

In the third operation, shared channel usage, while transmitting window timing to all the listening subscribers, the repeater keeps track of upcoming allocation in the next predetermined number (e.g., 3) of windows. If there are no allocations in these windows, then the repeater may permit shared channel usage (i.e., allow co-channel licensees to be able to use the channel) or enter a conservation of energy mode (hibernation) until needed. While in hibernation, the repeater maintains the window timing and if there are allocations in next predetermined number windows, then the repeater performs a self wakeup and starts transmitting window timing again. This allows a subscriber having previously reserved a particular window and arriving on the channel to send a location update without having to wake up the repeater (thereby preventing increased time away from working channel). In this embodiment, however, a subscriber arriving to request a location update window may send out a predetermined wake-up signal to the repeater to activate the portion of the repeater engaged in location update.

Figure 7:
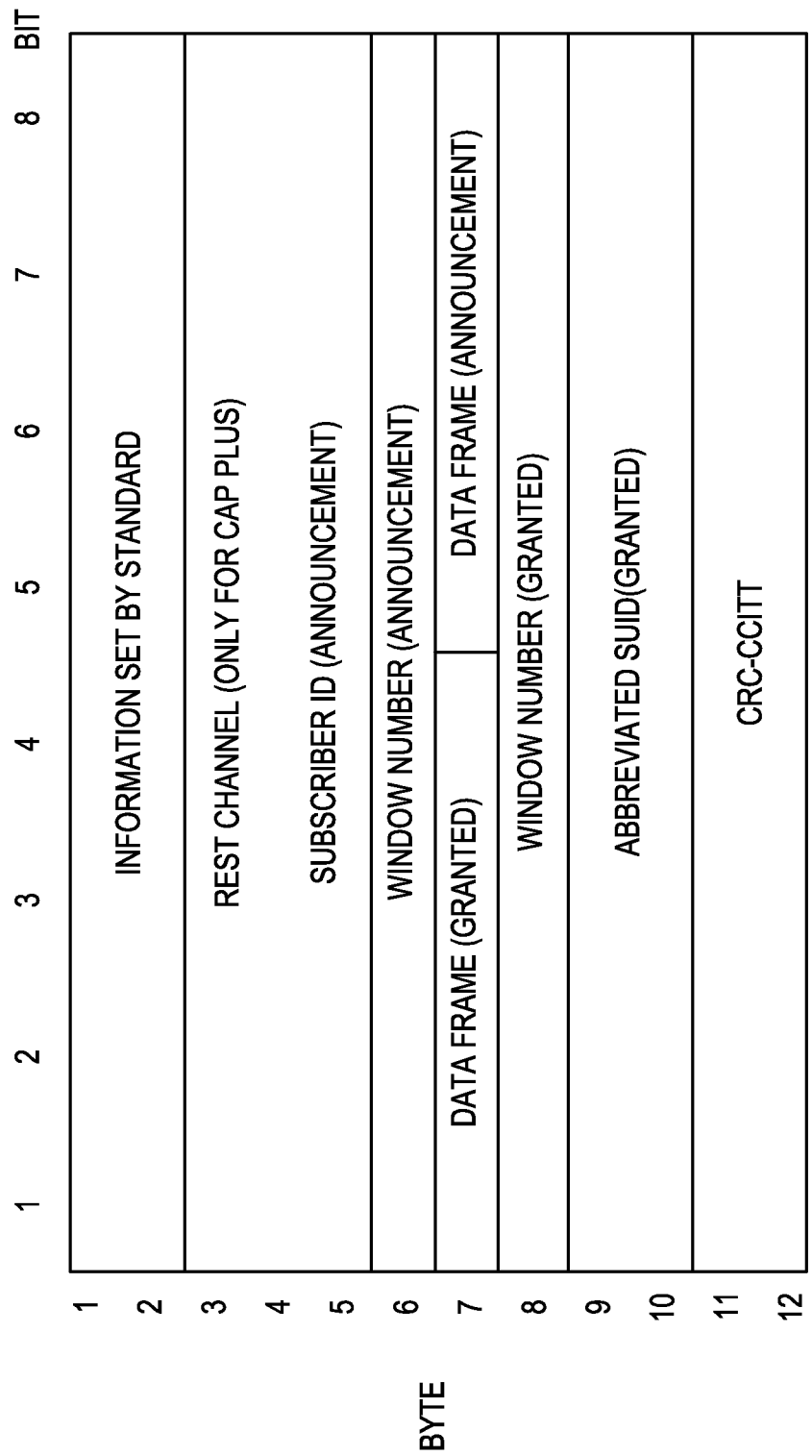
FIG. 7 illustrates one embodiment of an announcement containing a grant.

One embodiment of an announcement is shown in FIG. 7. In this embodiment, the announcement contains two parts: an announcement portion, which provides information related to the next window (after the current window) and a grant portion. The window announcement is formed from 12 bytes (each byte is 8 bits). The first and last two bytes of the window announcement contain identification and control information (e.g., a cyclic redundancy check), which is set by the standard and thus will not be described in further detail.

The announcement portion contains, in some systems (such as that of U.S. patent application Ser. No. 12/331,180, filed on Dec. 9, 2008 and entitled "Method For Trunking Radio Frequency Resources," which is herein incorporated by reference in its entirety), the identity of the Rest Channel ID (1 byte) and the abbreviated (e.g., truncated, hashed, or aliased) identity of the subscriber assigned to use the next window (2 bytes). In conventional systems, the Rest Channel ID is not present (as the subscriber always knows the working channel to which to return) and the subscriber identity is 3 bytes. The Rest Channel is the channel that the subscriber, if idle, returns to after providing the location update. The announcement portion also contains the window number of the next window (1 byte) and the data frame to which the next window belongs (4 bits). The next window is not the current window (i.e., the window in which the announcement occurs) but is the succeeding window. This permits a subscriber, having previously been granted a particular window, to switch to the outbound data revert channel one window before its allotted time to check (by receiving the subscriber identity in the announcement portion) whether it still is scheduled to transmit its location update data and take appropriate measures if not. These measures include requesting a one-time window or new repeating window rather than transmitting its location update data.

The grant portion contains, if a request from a subscriber has been received, an identity of the subscriber who has been granted use of a particular window (2 bytes), the window number of the particular window (1 byte), and the data frame where granted window starts (4 bits). As the identity of the subscriber is normally 3 bytes in length, but only 2 bytes is always available in the grant portion, an abbreviated identity of the grantee is used. The identity can be abbreviated in any predetermined manner (e.g., by truncating the identity), which can be the same as or different from the manner used to abbreviate the subscriber identity in the announcement portion, so long as the subscribers are aware of the manner in which the identity is abbreviated and thus are able to determine the grantee in addition to the granted time (frame and window).

Figure 8:
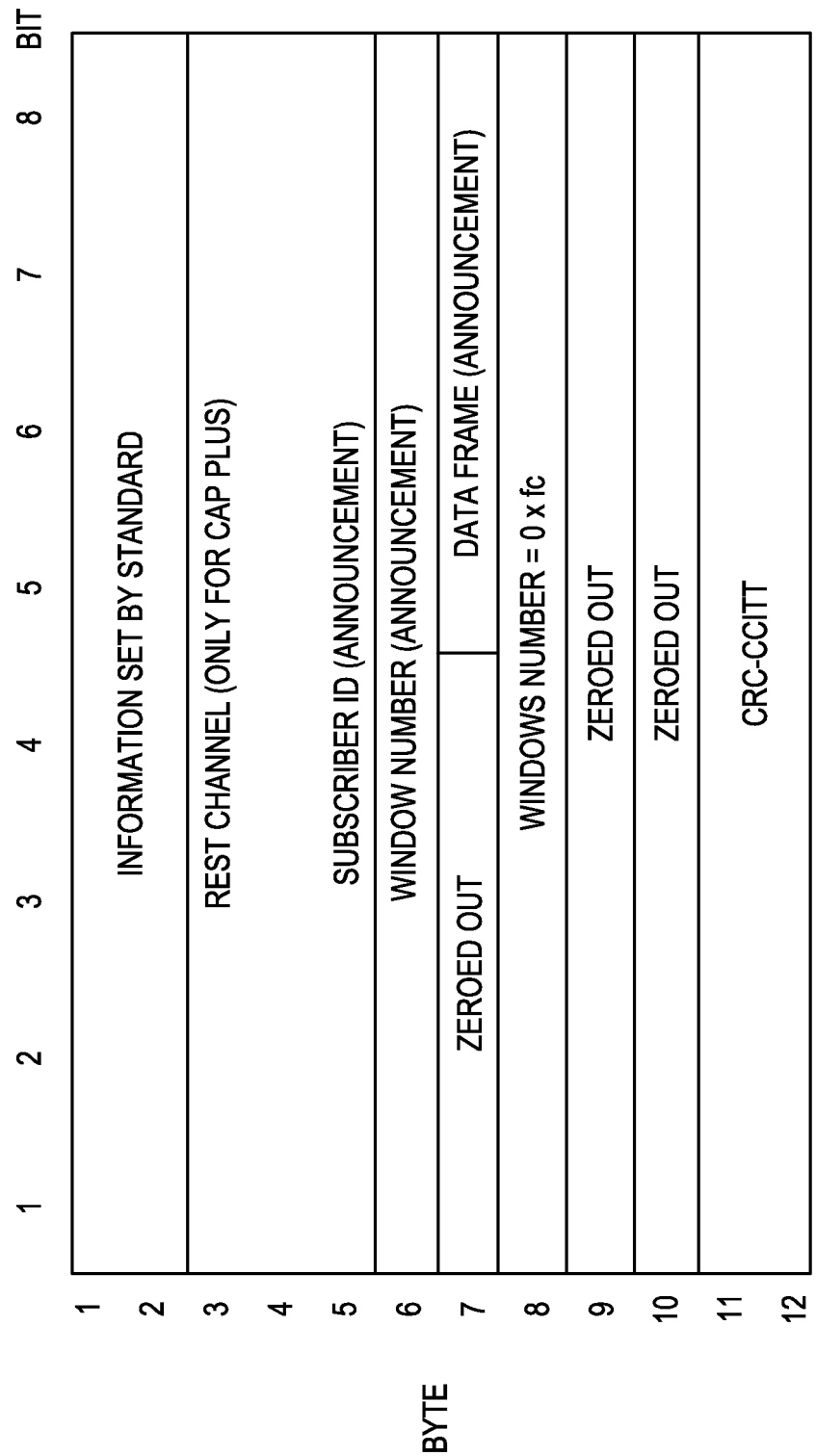
FIG. 8 illustrates one embodiment of an announcement that does not contain a grant.

If there has been no request before the announcement, the grant portion of the announcement is zeroed out as shown in FIG. 8, although portions may be used for other purposes. For example, as the window number in the grant portion is 8 bits long, 256 different windows may be indicated. As discussed previously only a predetermined number of windows are able to be assigned in each frame, as defined by the particular burst size used in the window (e.g., 100 windows when a 5 burst window is used, 83 when a 6 burst window is used, etc. . . . ). This predetermined number of windows is less than the available window numbers able to be indicated. The window numbers in excess of the valid window numbers may thus be used to transmit scheduling availability or other information. For example, the window number may be used to indicate that the announcement contains only an announcement (i.e., no grant information) ($FC_{16}$), that the repeater is unable to allocate any more requests for periodic updates ($FD_{16}$), that the repeater is unable to allocate any more one-time update requests or the next available window is more than a preset relatively long time (e.g., 1 minute) away ($FE_{16}$), or that there are no more windows available for any (i.e., one-time or periodic) requests ($FF_{16}$).

Figure 9:
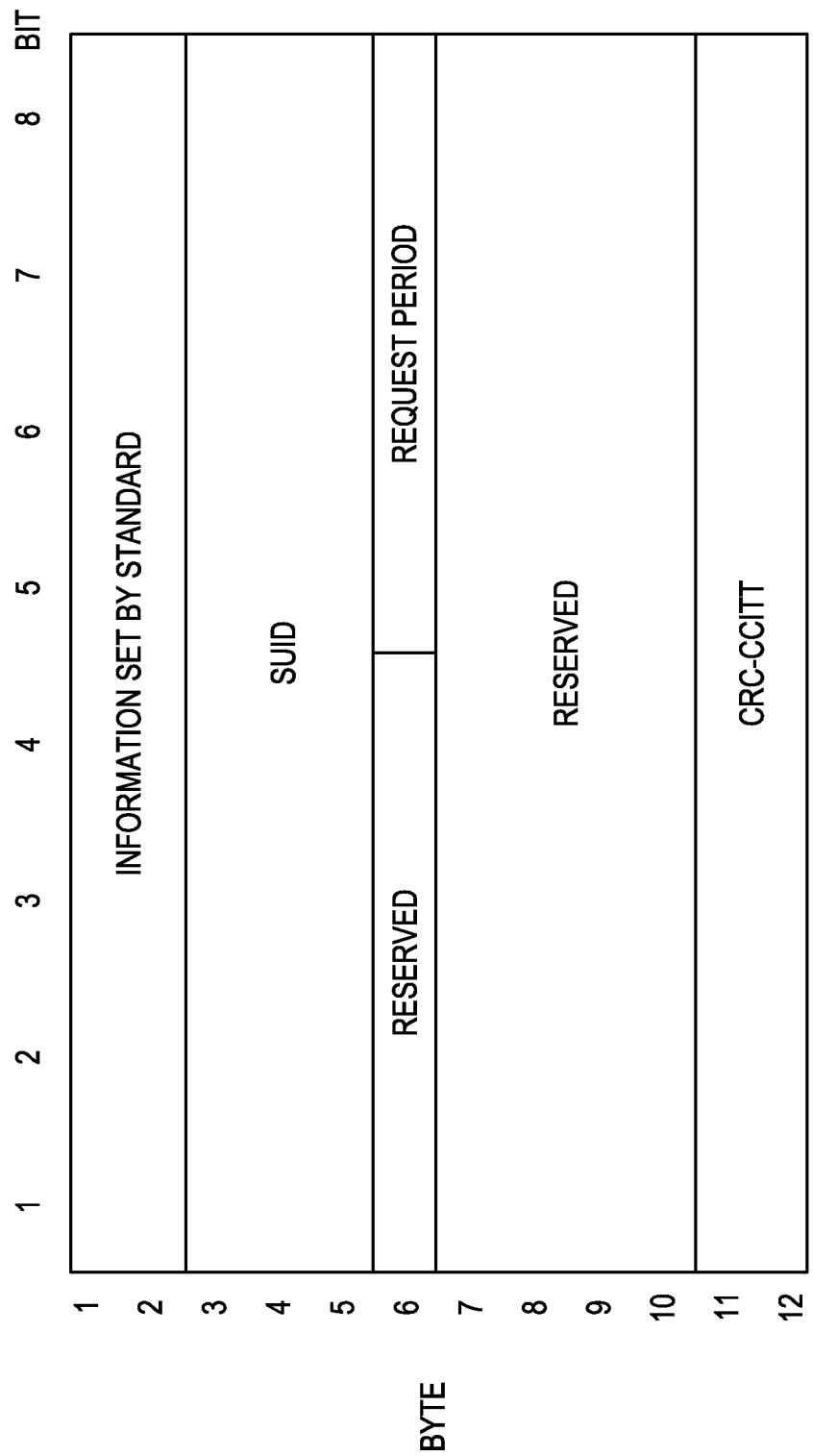
FIG. 9 illustrates one embodiment of a request from a subscriber.

One embodiment of a request from a subscriber is shown in FIG. 9. In this embodiment, the full subscriber identity (24 bits) follows the data set by the standard. The request period (4 bits) follows the subscriber identity. The remaining 36 bits are reserved for future use and can be used to provide additional information. As the request period is 4 bits, a maximum of 16 different requests can be indicated. For example, $0000_2$ may indicate that the subscriber desires a one-time window, $0001_2$ may indicate that the subscriber desires a repeated window every 30 s, $0010_2$ may indicate that the subscriber desires a repeated window every 1 minute, etc. . . . Unused values in the request period may as above be reserved for later information (that may or may not pertain to the location information).

In certain embodiments, a number of repeaters may be linked together so that they repeat the same location update. In particular, one repeater (the scheduler) may perform the scheduling for all of the repeaters and generate the announcement (or information to be used in the announcement such as grant information), which is then relayed to the other repeaters (referred to hereinafter dummy or slave repeaters) for transmission.

Figure 10A:
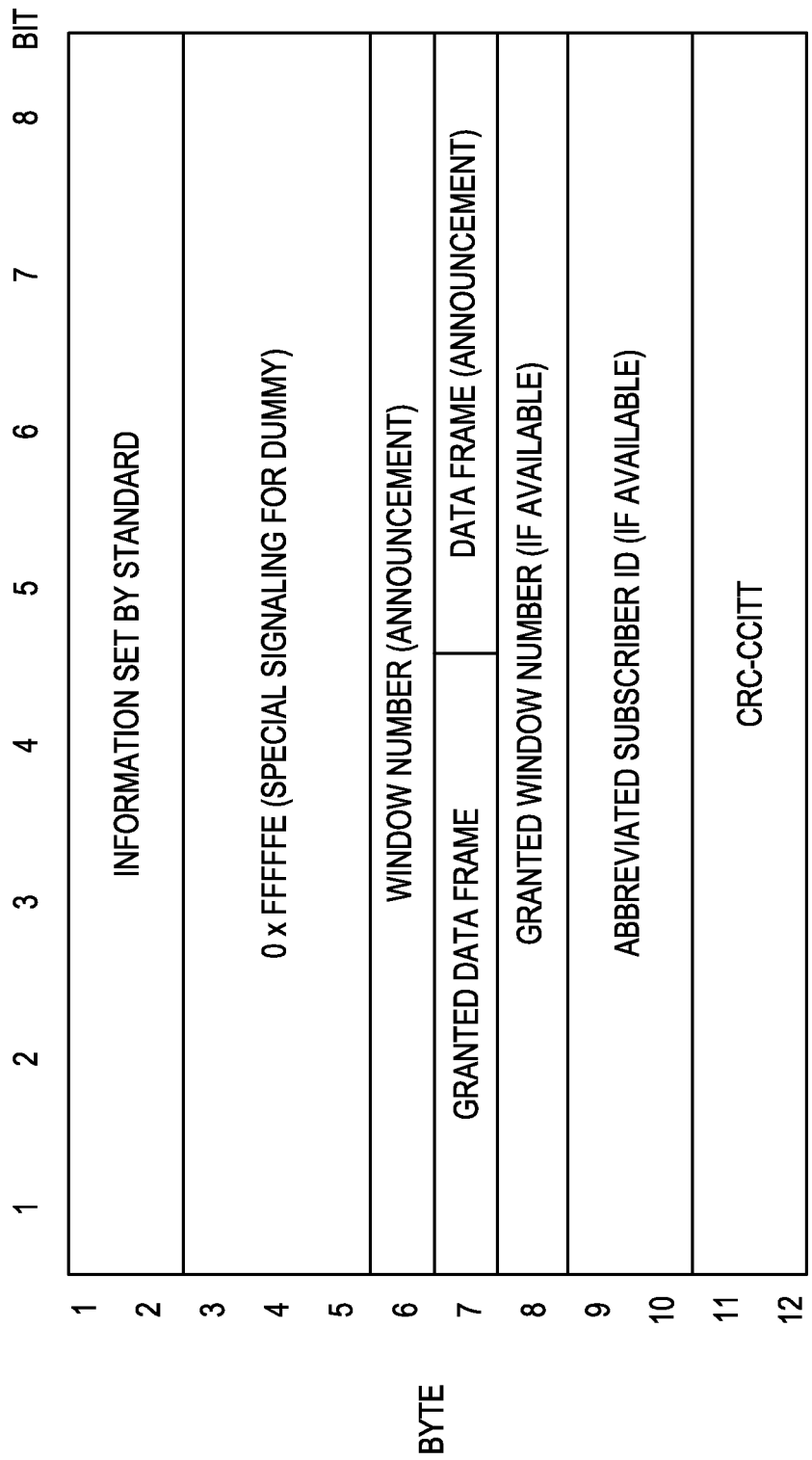
FIG. 10A illustrates one embodiment of an announcement containing the grant but not the next window allocation.
Figure 10B:
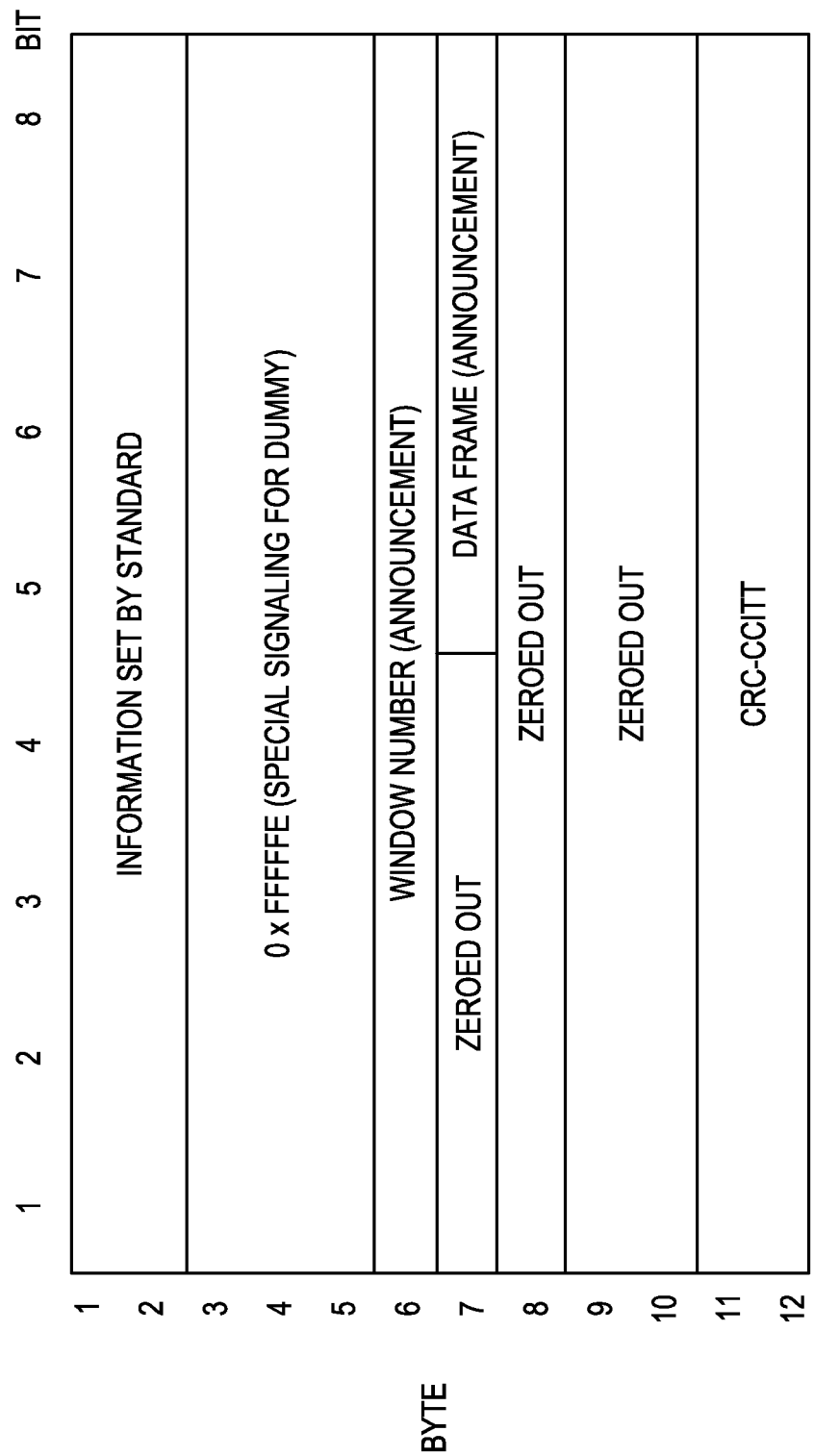
FIG. 10B illustrates one embodiment of an announcement containing neither the grant nor the next window allocation.

In one embodiment, the scheduler transmits the announcement portion and the grant portion in separate messages to the dummy repeaters. In this case, a grant message is sent over the IP first and if the announcement is lost, then the grant is provided in the dummy announcement over the air. Grants and dummies are not transmitted over the air separately. Grants are sent early to enable them to be processed earlier and to account for IP delays and jitter. Thus, it is possible that either or both the subscriber identity for the next window (information in the announcement portion) or the scheduling information in the grant portion may be lost or delayed and thus not reach one or more of the dummy repeaters. In any case, an announcement is transmitted from each of the repeaters in each window, whether or not the repeater has the information from the scheduler. FIG. 10A illustrates an announcement in which the message containing the grant portion is received but the message containing the announcement portion is not received, while FIG. 10B illustrates an announcement in which neither the message containing the grant portion nor the message containing the announcement portion is received. In both cases, the window number and the data frame of the next window is known without any message being received from the scheduler—only the subscriber information is missing. Predetermined addressing information may be inserted in place of the expected subscriber information so that a subscriber expecting its address in the subscriber identity in the announcement (i.e., it was previously granted) transmits at the appropriate time even though its identity is not present in the announcement.

Other problems arise from linking repeaters. As can be seen from the top set of bursts in FIG. 11, a location update is transmitted from a subscriber at the scheduled time to the local slave repeater (the slave repeater receiving the location update over the air on the uplink). The local slave repeater retransmits the location information. However, due to delay ($\Delta t$) in the internet through which the slave repeater and scheduler communicate, the location update arrives at the scheduler delayed sufficiently so that, as illustrated, all of the information contained in the bursts cannot be repeated in the same window. To accommodate for this delay, the window size (Win'2) of the scheduler may be increased as shown in the bottommost set of bursts. In the example shown in FIG. 11, the size of the window of the subscriber and local slave repeater is 6 bursts while for the scheduler the window size is 9 bursts. This method permits both the slave and scheduler repeaters to rebroadcast the entire location update. The delay may change from repeater to repeater. Accordingly, the size change of the window may be dependent on the originating repeater (serving the subscriber) or the size change may be set to a single value defined by the maximum delay. Changing the window size, however, detrimentally impacts the system throughput.

In addition, the inherent delay may cause a loss of request opportunities. As described in one of the above embodiments, subscribers each may request a one-time or repeating window in any idle timeslot of the repeater. Each subscriber determines that the next window (and thus timeslots within the window) is idle from the repeater announcement and thus transmits its request during one of the timeslots (say chosen at random). If only one request is transmitted in the free window, the scheduler may transmit the grant in the announcement. If multiple requests are transmitted in the free window however, the scheduler is supposed to process these requests and send the grants back in timeslots of the same free window. However, because of processing delay (for example 60 ms) and inbound-outbound delay, even though multiple requests may be received in the empty window, fewer than all of the requests may be able to be processed within the same free window. For example, requests transmitted to the scheduler in the last free timeslot may not be able to be processed by the scheduler before the next announcement.

The above issue becomes even more problematic when the scheduler is not the local repeater(s) to which the subscribers are transmitting the requests. Due to the delays transmitting the information through the system from the local repeater to the scheduler, only one or two requests may be able to be processed in the same free window. This leads to loss of window request opportunities, which in turn causes increased traffic due to the increased number of re-requests as well as increased time away from working channel for the subscribers.

Figure 12:
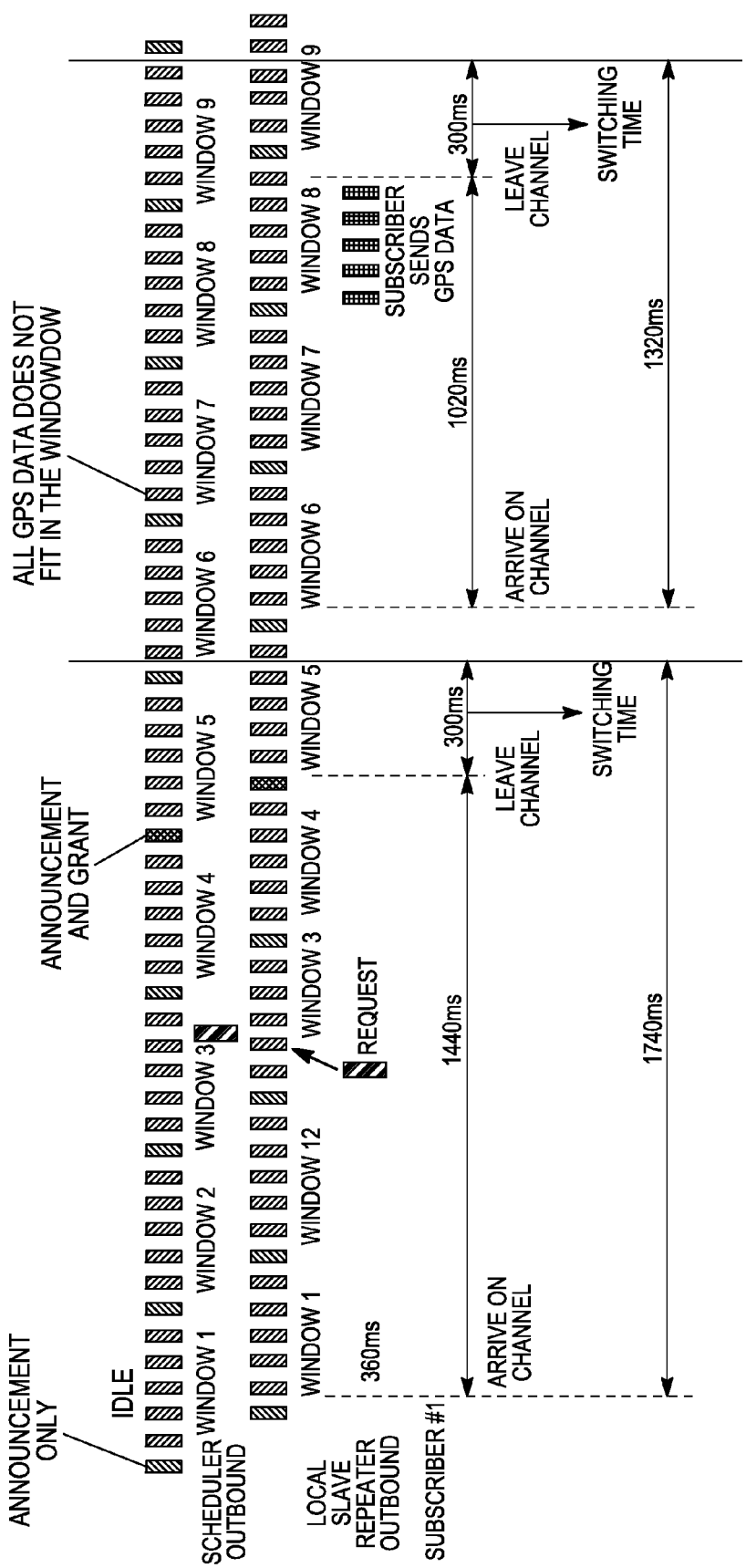
FIG. 12 illustrates one embodiment of timing for requests and grants.

It is also desirable to limit the amount of time a subscriber spends on the data revert channel and away from the working channel—either to send a location update or to request a window—so that the subscriber spends more time on the working channel to avoid late entry scenarios and miss voice/data calls on the working channel. In the example of FIG. 12, a subscriber spends 1.38-1.740 s away from the working channel (1.08-1.44 s on the data revert channel to request a window—between 3 and 4 windows depending on when it arrives in the channel—and 0.3 s switching time) and 1.320 s for sending the location update.

In order to overcome the problems associated with the delays while maintaining system throughput, the repeaters buffer requests and location updates (e.g., for 120 ms) to account for timing differences caused by different delays in the various links. To achieve the desired results, the subscribers transmit their location updates one window earlier than the reserved window. This data is buffered by the repeaters until it is time for the reserved window.

Figure 13:
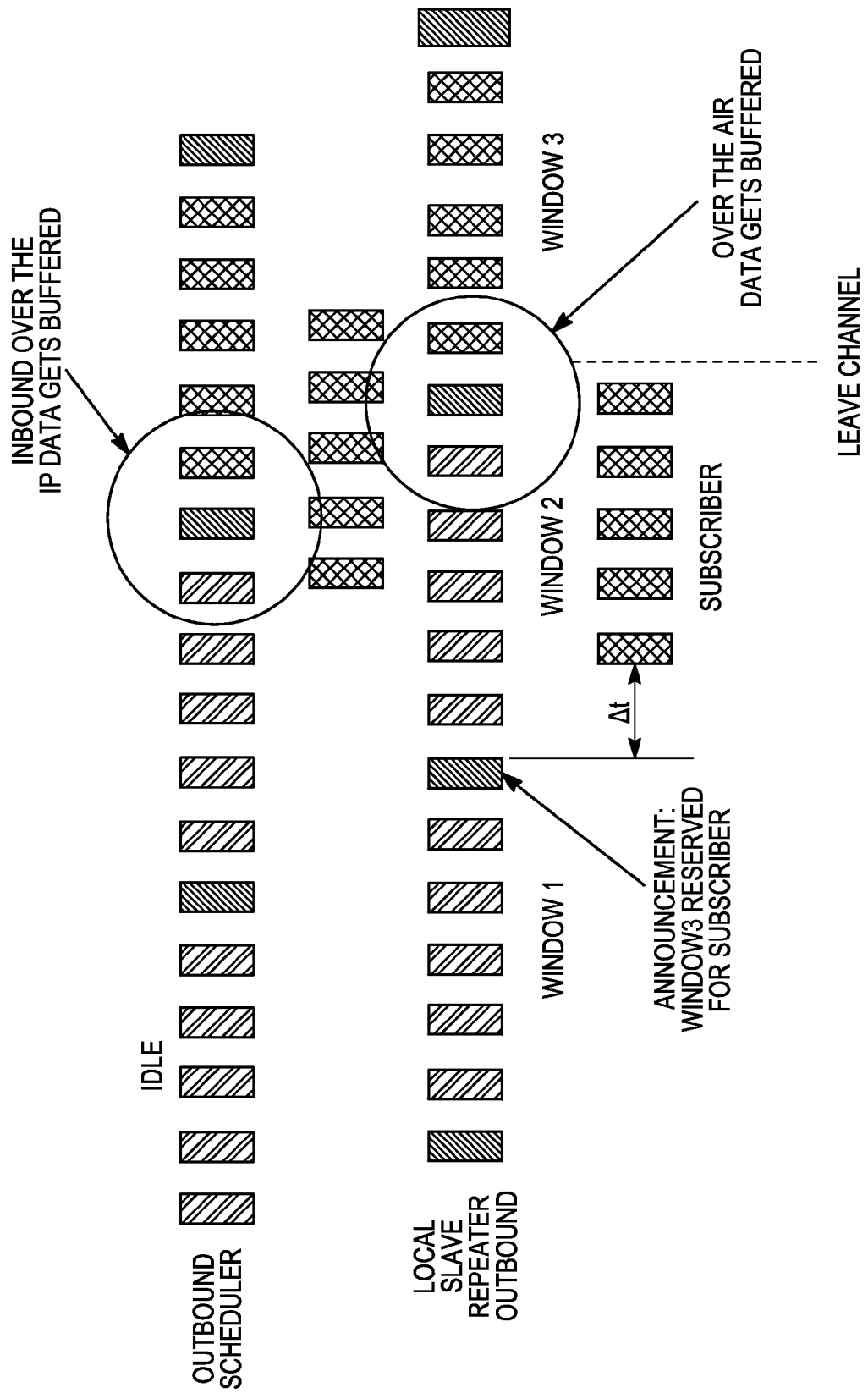
FIG. 13 illustrates one embodiment of location update timing when buffering.

As in previous embodiments, the subscriber arrives on the data revert channel early enough to listen to an announcement. This announcement indicates the subscriber for which the next (not current) window has been reserved, enabling the subscriber to confirm that the next window is still reserved for the subscriber. As shown in FIG. 13, once the subscriber confirms its reservation, the subscriber waits for a predetermined amount of time (e.g., $\Delta t$=90 ms), transmits its location update during the current window—one window early 9 (i.e., before the adjacent window), and leaves the data revert channel for the working channel. The predetermined amount of time permits the subscriber to process with sufficient time the announcement and transmit in the next available burst (60 ms until the next set of timeslots). The local slave repeater receives the location update and sends it over the internet to the scheduler. The local repeater, however, buffers the location update and does not transmit the location update over the air until the time for the next announcement. Similarly, the scheduler also receives the location update over the internet and buffers it rather than transmitting the location update over the air until it is time for the next announcement. After the next announcement, both the scheduler and slave repeaters transmit the buffered location update in the reserved window. The amount of buffering used is sufficient to overcome the aforementioned variable internet delay and is up to the size of one window. As the location update is transmitted in the same window on scheduler and slave repeaters immediately after the announcement, an increase of the window size of the scheduler may be avoided.

Figure 14:
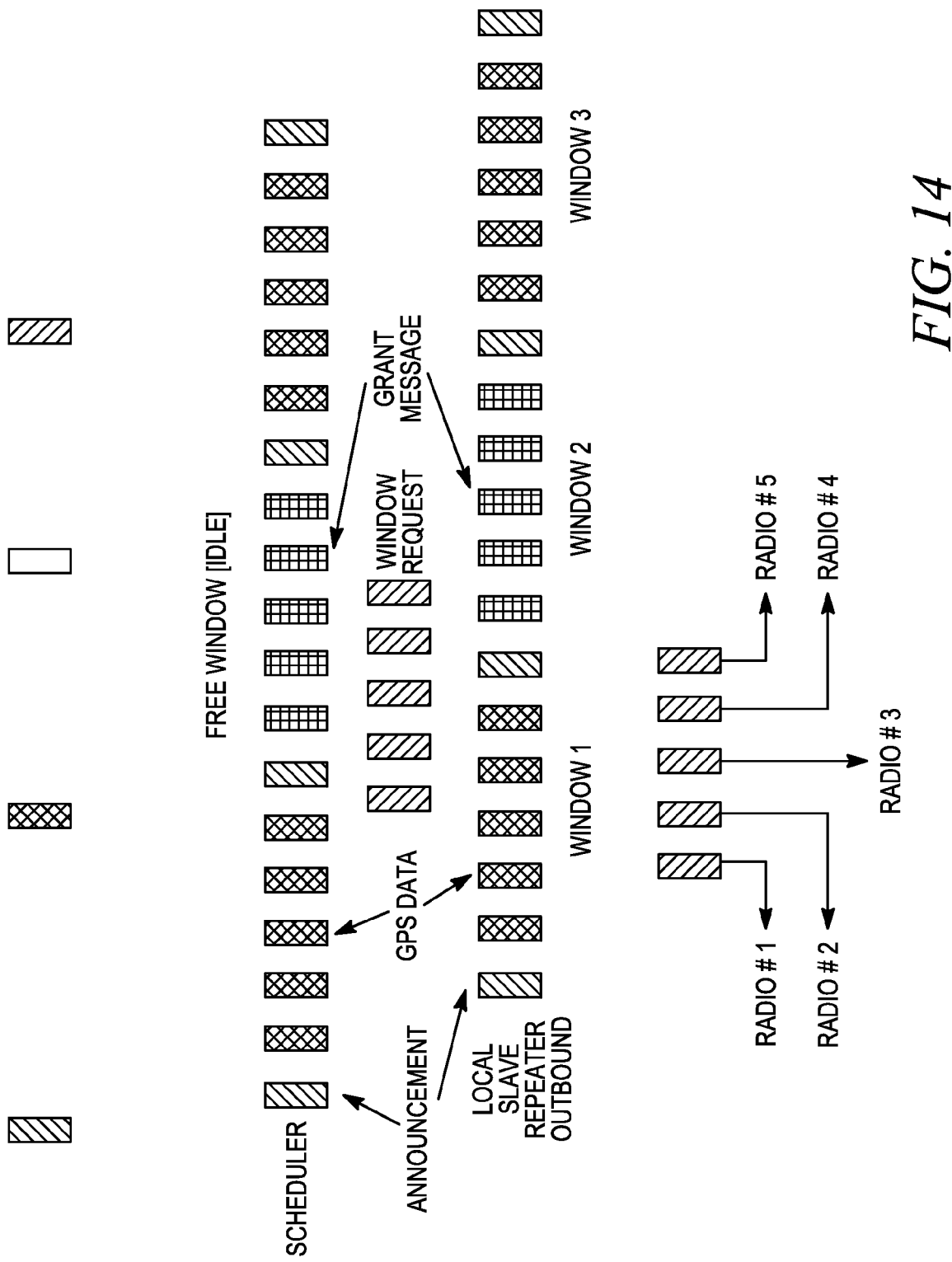
FIG. 14 illustrates one embodiment of timing for requests and grants when buffering.

In addition, as the announcement may indicate that the next window is idle, as shown in FIG. 14 subscribers attempting to reserve windows send their request messages in the current window rather than the next window. The requests are immediately passed to the scheduler over the internet from the slave repeater. At the scheduler, the requests are buffered and their grants are not sent out until the time for next announcement has been reached. The grants are then sent in the free window over the internet to the slave repeater and transmitted over the air to the subscribers. By using buffering an increased number of requests can be processed in one empty window as well as providing the scheduler more time to process the requests.

Figure 15:
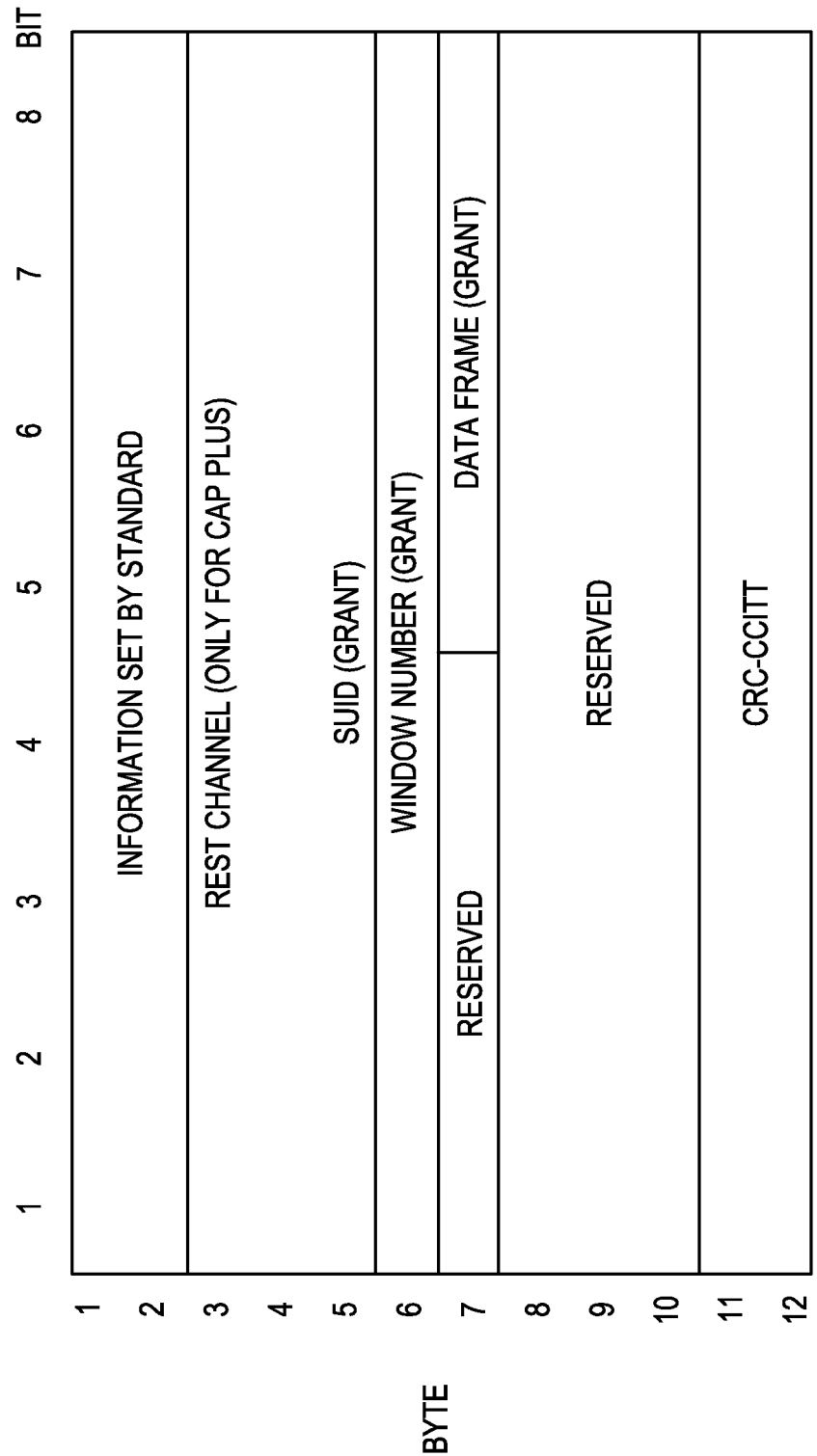
FIG. 15 illustrates one embodiment of a grant only message used when empty windows are employed to provide grants.

In one embodiment, the grants are transmitted directly to each of the subscribers individually. As the message is an individual message to a subscriber rather than an announcement, the information normally present in the announcement portion (the next window number and data frame as well as the scheduled subscriber if present), may be eliminated. In one embodiment of a grant message, shown in FIG. 15, placement of information in relation to an announcement may be adjusted—the information in the grant portion is moved to the location of the announcement portion and the grant portion is zeroed out (reserved for later use in which special signaling may be provided at a later date). Thus, as shown, the full subscriber identity (or rest channel location and abbreviated subscriber identity) of the subscriber who is receiving the grant (and to whom the grant message is intended) is disposed in the location that in the announcement would be reserved for the scheduled subscriber in the next window. In addition, the window number and frame number for the subscriber to transmit the location update is provided in the grant message in the locations reserved for the next window number and frame number in the announcement. In another embodiment, the announcement portion may be zeroed out and the grant provided in the grant portion of the grant message.

In the above embodiments, the repeater provides individual announcements for each subscriber during one or more timeslots in each individual set of timeslots. In other embodiments however, the repeater may provide one announcement in one or more timeslots for up to all N timeslots. Thus, the same announcement may provide information for multiple subscribers.

Figure 11:
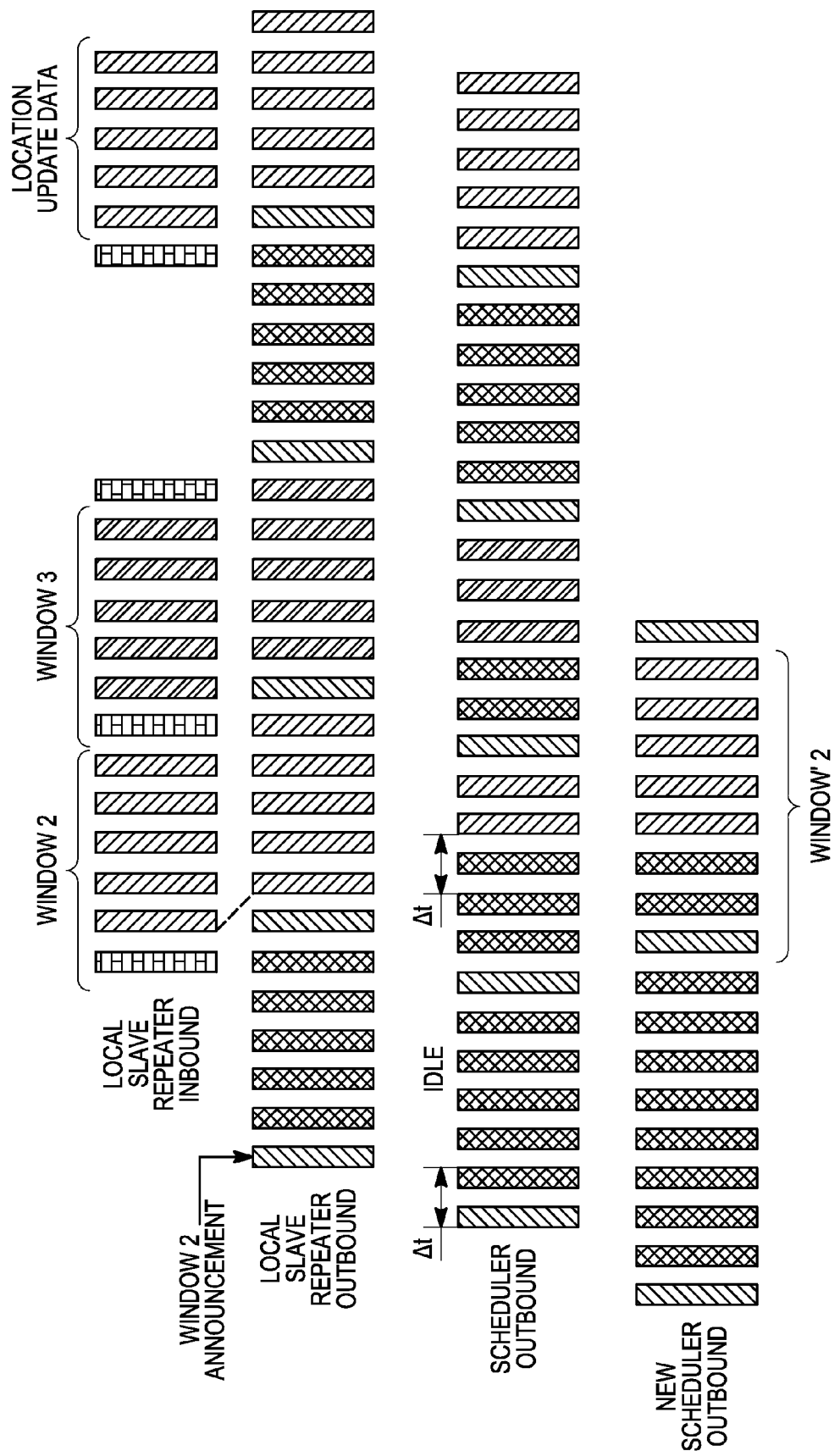
FIG. 11 illustrates one embodiment of extending the window of the scheduler.

In summary, the subscriber transmits in the earlier window, the location update or request is immediately sent to the scheduler from the slave repeater, and buffering of the over the air transmission occurs in the scheduler only (for requests) or both the scheduler and slave repeaters (for location updates). The latter permits the subscriber to leave about 1 window sooner than in other embodiments (as shown in FIG. 11, 360 ms).

In the above embodiments, the scheduling (request and grant) are provided on the same channel as the announcement and update. However, in another embodiment the request may be sent and the response received on the working channel instead of the data revert channel. Moreover, in further embodiments the scheduling may occur on a different working channel than that used for data transmission/reception or a different data revert channel than that used for the announcement and update. By sending the request and receiving the response on the working channel, another working channel, or another data revert channel, the response message can be extended to additionally allocate and identify a data revert channel. This permits the freeing up of windows that may otherwise have been reserved on the data revert channel for one time requests, thus improving data throughput on the data revert channel.

In addition, although the above has primarily involved the subscriber switching from the working channel to the data revert channel for updates and perhaps scheduling, a similar principle can apply to a repeater. For example, if it is desirable for the repeater to provide scheduling and repeat on different channels at different times, the repeater can switch to the data revert channel prior to transmitting the announcement or prior to receiving the update (if the announcement is provided on a different channel from the data revert channel) and then switch to another channel after receiving the update.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

The invention claimed is:

1. A method of communicating information from a subscriber, the method comprising:

transmitting, by the subscriber, a request to transmit a plurality of location updates on a data revert channel, and at a specified periodic rate, to a repeater;

receiving, by the subscriber, a response to the request from the repeater, the response granting the request and containing a location update time for the subscriber to transmit a first location update of the plurality of location updates on the data revert channel in accordance with the specified periodic rate; and responsive to determining, by the subscriber, that the subscriber is not currently participating in any active communications occurring on a working channel over which audio and/or video communications are transmitted:

switching, by the subscriber, from the working channel to the data revert channel before the location update time; and transmitting, by the subscriber, the first location update on the data revert channel at the location update time; and transmitting subsequent location updates of the plurality of location updates on the data revert channel at times in accordance with the specified periodic rate; and further comprising:

further comprising the repeater de-allocating periodic windows reserved for updates from the subscriber if a predetermined number of consecutive scheduled updates from the subscriber are not received by the repeater, the predetermined number dependent on the specified periodic rate identified in the request; and determining whether to override a decision to de-allocate the periodic windows based on the number of windows in a data superframe that are reserved.

2. The method of claim 1, wherein the repeater is a local slave repeater.

3. The method of claim 1, further comprising, while on the data revert channel, receiving location updates of other subscriber stations from the repeater.

4. The method of claim 1, wherein the specified periodic rate is between once every 30 seconds and once every 480 seconds, inclusive.

* * * * *